(12) United States Patent
Morimoto et al.

(10) Patent No.: US 8,601,192 B2
(45) Date of Patent: Dec. 3, 2013

(54) ARBITRATION DEVICE, ARBITRATION SYSTEM, ARBITRATION METHOD, SEMICONDUCTOR INTEGRATED CIRCUIT, AND IMAGE PROCESSING DEVICE

(75) Inventors: Takashi Morimoto, Osaka (JP); Yoshiharu Watanabe, Osaka (JP); Takashi Yamada, Hyogo (JP); Takashi Hashimoto, Hyogo (JP); Koji Asai, Hyogo (JP)

(73) Assignee: Panasonic Corporation, Osaka (JP)

( * ) Notice: Subject to any disclaimer, the term of this patent is extended or adjusted under 35 U.S.C. 154(b) by 289 days.

(21) Appl. No.: 13/057,019

(22) PCT Filed: Jun. 4, 2010

(86) PCT No.: PCT/JP2010/003741
§ 371 (c)(1),
(2), (4) Date: Feb. 1, 2011

(87) PCT Pub. No.: WO2010/143386
PCT Pub. Date: Dec. 16, 2010

(65) Prior Publication Data
US 2011/0138092 A1 Jun. 9, 2011

(30) Foreign Application Priority Data
Jun. 8, 2009 (JP) .................. 2009-136967

(51) Int. Cl.
*G06F 12/00* (2006.01)
*G06F 13/14* (2006.01)
(52) U.S. Cl.
USPC .......................................... 710/243; 710/244
(58) Field of Classification Search
USPC .............................................. 710/243, 244
See application file for complete search history.

(56) References Cited

U.S. PATENT DOCUMENTS

| 6,119,196 | A | 9/2000 | Muller et al. |
| 6,269,418 | B1 | 7/2001 | Nakamura |
| 6,996,684 | B2 * | 2/2006 | Tseng et al. .................. 711/151 |

(Continued)

FOREIGN PATENT DOCUMENTS

| JP | 9-128325 | 5/1997 |
| JP | 9-128346 | 5/1997 |
| JP | 11-31123 | 2/1999 |
| JP | 2002-508099 | 3/2002 |
| JP | 2004-288021 | 10/2004 |
| JP | 2006-172256 | 6/2006 |
| JP | 2007-156560 | 6/2007 |
| WO | 2010/086906 | 8/2010 |

OTHER PUBLICATIONS

International Search Report issued Aug. 31, 2010 in International (PCT) Application No. PCT/JP2010/003741.

*Primary Examiner* — Paul R Myers
*Assistant Examiner* — Christopher A Daley
(74) *Attorney, Agent, or Firm* — Wenderoth, Lind & Ponack, L.L.P.

(57) ABSTRACT

Provided is a hierarchical arbitration device wherein an arbitration device at each level of the hierarchy selects a resource use request having the highest priority and a resource use request having the second highest priority, outputting these two resource use requests to the arbitration device that is one level higher. After outputting the memory use request having the highest priority to a resource control unit as the top priority resource use request, when the arbitration device at the highest level of the hierarchy receives a signal from the memory control unit indicating receipt of the resource use request, the arbitration device then selects the resource use request having the second highest priority and outputs this resource request as the next top priority resource use request.

6 Claims, 19 Drawing Sheets

(56) References Cited

U.S. PATENT DOCUMENTS

| | | |
|---|---|---|
| 7,007,123 B2 * | 2/2006 | Golla et al. .................... 710/243 |
| 7,680,971 B2 * | 3/2010 | Blumrich et al. ............. 710/244 |
| 7,865,647 B2 * | 1/2011 | Jacob ............................ 710/244 |
| 8,065,458 B2 * | 11/2011 | Nagao et al. .................. 710/244 |
| 8,307,147 B2 * | 11/2012 | Goren et al. ................... 710/316 |
| 2002/0176431 A1 * | 11/2002 | Golla et al. ................... 370/412 |
| 2004/0210694 A1 * | 10/2004 | Shenderovich ............... 710/113 |
| 2006/0149884 A1 | 7/2006 | Saen et al. |
| 2007/0174529 A1 * | 7/2007 | Rodriguez et al. ............ 710/240 |

* cited by examiner

Memory use request command

Acknowledge signal

| Name of master 501 | Priority 502 |
|---|---|
| Processor 100 | 1 |
| Video output engine 101 | 2 |
| Encryption engine 102 | 3 |
| Stream engine 103 | 4 |
| Decoder A 114 | 5 |
| Decoder B 115 | 6 |
| Encoder 116 | 7 |
| Image enhancement engine 117 | 8 |

Memory use request command

ARBITRATION DEVICE, ARBITRATION SYSTEM, ARBITRATION METHOD, SEMICONDUCTOR INTEGRATED CIRCUIT, AND IMAGE PROCESSING DEVICE

TECHNICAL FIELD

The present invention relates to arbitration devices that arbitrate resource use requests from a plurality of masters.

BACKGROUND ART

In some systems, a plurality of devices such as a processor, decoder, etc. (hereinafter referred to as "masters") are connected by a bus to a memory so that the masters share the memory.

In such a system, an arbitration device is provided to address the issue of memory contention among memory use requests from the masters. The arbitration device selects one of the contending memory use requests and outputs it as the memory use request having the highest priority.

Based, for example, on previously determined information that indicates a priority ranking of memory use requests, the arbitration device selects and outputs the contending memory use request having the highest priority.

In systems where a plurality of masters use the memory, only the master that issued the memory use request having the highest priority output by the arbitration device is permitted to use the memory via the bus.

Patent Literature 1, for example, discloses technology for a plurality of masters to share a memory.

In systems where a plurality of masters share the memory, arbitration devices may be structured hierarchically out of consideration for timing or the length of physical wiring in cases such as when the number of masters is large, or when the masters are physically separate from one another.

Hierarchically structured arbitration devices are structured with an arbitration device at each level in the hierarchy to arbitrate memory use requests at that level. These arbitration devices are connected to each other in a daisy-chain or tournament style.

The arbitration device at a lower level in the hierarchy receives memory use requests from masters belonging to that level, selects the memory use request having the highest priority, and outputs the selected memory use request to the arbitration device that is one level higher.

The arbitration device that is one level higher in the hierarchy receives memory use requests from masters belonging to that level and from the arbitration device at the lower level, selects the memory use request having the highest priority, and outputs the selected memory use request to the arbitration device that is yet one level higher.

In this way, starting at the lowest level of the hierarchy, each arbitration device in the hierarchy selects the memory use request having the highest priority among the level of the arbitration device and lower levels and outputs the memory use request to the arbitration device that is the next level up in the hierarchy. Ultimately, the memory use request having the highest priority as output by the arbitration device at the highest level in the hierarchy becomes the memory use request having the highest priority in the system.

However, since the arbitration devices in the hierarchy arbitrate in order from the lowest level, it is difficult to physically dispose the circuit so as to shorten processing time between the start of arbitration and the output of the memory use request having the highest priority.

Typically, when a memory controller or the like receives the memory use request having the highest priority output from the arbitration device, the memory controller allows the master that issued the memory use request to use the memory.

The interval from the arbitration device outputting the memory use request having the highest priority and the master receiving a response signal from the memory controller for the memory use request until the next memory use request having the highest priority occurs is hereinafter referred to as "latency". When the period of memory used by the master receiving the response signal is shorter than the latency, the memory is not used during the time difference between the latency and the period of memory use, a phenomenon hereinafter referred to as the "bubble phenomenon".

In a memory use system employing hierarchical arbitration devices, it is difficult to reduce the latency of the hierarchical arbitration devices, and therefore the problem of the bubble phenomenon may occur.

Patent Literature 2 discloses an example of technology to reduce occurrence of the bubble phenomenon in a memory use system employing hierarchical arbitration devices.

This technology for hierarchical arbitration devices provides, between a lower level and an upper level, a cache memory for temporarily storing data in the main memory used in response to a memory use request. If the memory use request having the highest priority in the lower level hits the cache memory, the cache memory is used instead of the main memory.

With this technology, if a memory use request at a lower level hits the cache memory, the cache memory is used without waiting for the results of arbitration at higher levels. Accordingly, when the memory use request hits the cache memory, the memory use system employing hierarchical arbitration devices performs as though the above latency had become shorter.

CITATION LIST

Patent Literature

Patent Literature 1: Japanese Patent Application Publication No. 2004-288021
Patent Literature 2: Japanese Patent Application Publication No. 9-128346

SUMMARY OF INVENTION

Technical Problem

In the above conventional technology, however, a memory use request only hits the cache memory if the master repeatedly issues identical memory use requests. This causes a problem in that in a system where a master does not repeatedly issue identical memory use requests, the effect of shortened latency is not achieved by using a cache.

In light of the above problem, it is an object of the present invention to provide an arbitration system that reduces occurrence of the bubble phenomenon even in a system in which a master does not repeatedly issue identical memory use requests, as well as to provide an arbitration device useful in the arbitration system.

Solution to Problem

To solve the above problem, an arbitration system according to the present invention comprises one or more arbitration devices that each include a first receiving unit operable to receive one or more resource use request commands from a plurality of devices; an arbitration unit operable, when the first receiving unit receives a set of two or more resource use request commands during each of a plurality of predetermined cycles, to evaluate a priority of each resource use request command in the set and to select from the set a first resource use request command having a highest priority and a second resource use request command having a second highest priority; an output unit operable to output the first resource use request command and the second resource use request command selected by the arbitration unit to an external destination during each of the predetermined cycles; and a second receiving unit operable to receive a resource use response signal that includes information identifying a resource use request command, wherein upon receipt of the resource use response signal by the second receiving unit, the arbitration unit is operable to remove the resource use request command identified by the resource use response signal from the set from which the first resource use request command and the second resource use request command are selected. The arbitration system according to the present invention also comprises a third receiving unit operable to receive the first resource use request command and the second resource use request command output by the first arbitration device and a resource use request command from one or more devices; a final arbitration unit operable, for a set of resource use request commands received by the third receiving unit during each of the predetermined cycles, to evaluate a priority of each resource use request command in the set and to select from the set a top priority resource use request command having a highest priority; a final output unit operable to output, during each of the predetermined cycles, the top priority resource use request command selected by the final arbitration unit; a resource use request command receiving unit operable to receive the top priority resource use request command output by the final output unit; a fourth receiving unit operable to receive a resource use response signal; and a resource use response signal output unit operable, when the resource use request command receiving unit receives the top priority resource use request command, to output a resource use response signal including information identifying the top priority resource use request command to the second receiving unit and the fourth receiving unit, wherein upon receipt of the resource use response signal by the fourth receiving unit, the final arbitration unit is operable to remove the resource use request command identified by the resource use response signal from the set from which the top priority resource use request command is selected.

Advantageous Effects of Invention

In the arbitration system according to the present invention with the above structure, the first arbitration device outputs the resource use request command having the highest priority and the second resource use request command having the second highest priority.

Accordingly, occurrence of the bubble phenomenon is reduced during arbitration by the first arbitration device even when latency of arbitration performed by the first arbitration device is longer than the period of resource use by the top priority resource use request command. This is because after the resource use request command receiving unit receives the resource use request command having the highest priority as the top priority resource use request command, the final arbitration unit selects the resource use request command having the second highest priority, as was already output by the first arbitration device, as the new top priority resource use request command once the fourth receiving unit receives the resource use response signal.

In the above arbitration system, each resource use request command received by each first receiving unit may include information identifying a period of resource use, and the output unit in each of the one or more arbitration devices may output the second resource use request command during a same cycle as the first resource use request command only when the period of resource use of the first resource use request command is equal to or less than a predetermined period.

The bubble phenomenon only occurs when the period of resource use by a resource use request command is shorter than the latency of arbitration performed by the arbitration system.

Accordingly, after an arbitration device outputs the resource use request command having the highest priority, if the period of resource use by the request command having the highest priority is longer than the latency of arbitration that is initiated by the arbitration device, the resource use request command having the second highest priority output by the arbitration device is not effectively used.

In the arbitration system with the above structure, unnecessary power consumption is avoided, since when the predetermined time for each arbitration device is shorter than the latency of arbitration initiated by the arbitration device, each arbitration device does not output a resource use request command having the second highest priority, as such a command would not be used effectively.

In the above arbitration system, each resource use request command received by each first receiving unit may include information identifying a period of resource use, and the output unit in each of the one or more arbitration devices may output the second resource use request command during a same cycle as the first resource use request command only when a predetermined relationship is satisfied between (i) the period of resource use of the first resource use request command and (ii) a time lag until the first resource use request command arrives at the resource use request command receiving unit.

The bubble phenomenon only occurs when the period of resource use by a resource use request command is shorter than the latency of arbitration performed by the arbitration system.

Accordingly, after an arbitration device outputs the resource use request command having the highest priority, if the period of resource use by the request command having the highest priority is longer than the latency of arbitration that is initiated by the arbitration device, the resource use request command having the second highest priority output by the arbitration device is not effectively used.

In the arbitration system with the above structure, unnecessary power consumption is avoided, since when the predetermined relationship for each arbitration device is such that a period of resource use by the first resource use command is longer than the latency of arbitration initiated by the arbitration device, each arbitration device does not output a resource use request command having the second highest priority, as such a command would not be used effectively.

In the above arbitration system, each resource use request command may be for memory, and the resource use response signal output unit may output a signal to the memory to initiate output of data from an identified region of the memory when the top priority resource use request command, received by the resource use request command receiving unit, indicates reading from the identified region.

In the arbitration system with this structure, during reading of data from memory, occurrence of the bubble phenomenon is reduced.

In the above arbitration system, each resource use request command may be for memory, and the resource use response signal output unit may output a signal to the memory to initiate writing of data to an identified region of the memory when the top priority resource use request command, received by the resource use request command receiving unit, indicates writing to the identified region.

In the arbitration system with this structure, during writing of data to memory, occurrence of the bubble phenomenon is reduced.

To solve the above problem, an arbitration device according to the present invention comprises: a first receiving unit operable to receive one or more resource use request commands from a plurality of devices; an arbitration unit operable, when the first receiving unit receives a set of two or more resource use request commands during each of a plurality of predetermined cycles, to evaluate a priority of each resource use request command in the set and to select from the set a first resource use request command having a highest priority and a second resource use request command having a second highest priority; an output unit operable to output the first resource use request command and the second resource use request command selected by the arbitration unit to an external destination during each of the predetermined cycles; and a second receiving unit operable to receive a resource use response signal that includes information identifying a resource use request command, wherein upon receipt of the resource use response signal by the second receiving unit, the arbitration unit is operable to remove the resource use request command identified by the resource use response signal from the set from which the first resource use request command and the second resource use request command are selected.

The arbitration device according to the present invention with the above structure outputs the resource use request command having the highest priority and the second resource use request command having the second highest priority.

The above arbitration device is used at any level other than the top hierarchical level of an arbitration system in which a plurality of arbitration devices are connected in series. When the resource use request command receiving unit receives, as the top priority resource use request command, the resource use request command having the highest priority output by the above arbitration device, the arbitration device that is one level higher in the hierarchy and is connected to the above arbitration device selects the resource use request command having the second highest priority, as was already output by the above arbitration device, as the new top priority resource use request command.

Accordingly, even if the period of memory use by the resource use request command having the highest priority as output by the above arbitration device is shorter than the latency of arbitration by the first arbitration device, occurrence of the bubble phenomenon is reduced.

Therefore, this arbitration device is useful in an arbitration system that reduces occurrence of the bubble phenomenon.

In the above arbitration device, each resource use request command received by the first receiving unit may include information identifying a period of resource use, and the output unit may output the second resource use request command during a same cycle as the first resource use request command only when the period of resource use of the first resource use request command is equal to or less than a predetermined period.

The bubble phenomenon only occurs when the period of resource use by a resource use request command is shorter than the latency of arbitration performed by the arbitration device.

Accordingly, if the period of resource use by the request command with the highest priority is longer than the latency of arbitration performed by the arbitration device, the resource use request command having the second highest priority is not effectively used.

In the arbitration device with the above structure, unnecessary power consumption is avoided, since when a predetermined time is shorter than latency of arbitration, the arbitration device does not output a resource use request command having the second highest priority, as such a command would not be used effectively.

DESCRIPTION OF EMBODIMENTS

Embodiment 1

<Outline>

The following describes, as an embodiment of an arbitration device according to the present invention, a system LSI provided with a plurality of masters that use a shared memory and hierarchical arbitration devices that arbitrate memory use requests from the masters.

The hierarchical arbitration devices provided in the system LSI are composed of a plurality of arbitration devices, connected to each other in a hierarchical structure, that operate in synchronization with a shared clock signal.

Each arbitration device receives memory use requests from masters belonging to the level of the arbitration device and memory use requests from the arbitration device that is one level lower, selects the memory use request having the highest priority and the memory use request having the second highest priority, and outputs these two memory use requests to the arbitration device that is one level higher.

The arbitration device at the highest level of the hierarchy selects the memory use request having the highest priority and outputs this memory request to the memory control unit as a top priority memory use request.

After outputting the memory use request having the highest priority to the memory control unit as the top priority memory use request, when the arbitration device at the highest level of the hierarchy receives an acknowledge signal from the memory control unit indicating receipt of the memory use request, then the arbitration device selects the memory use request having the second highest priority and outputs this memory request to the memory control unit as a next top priority memory use request.

The following describes the configuration of a system LSI according to Embodiment 1 with reference to the drawings.
<Configuration>
<Overall Configuration>

Figure 1:
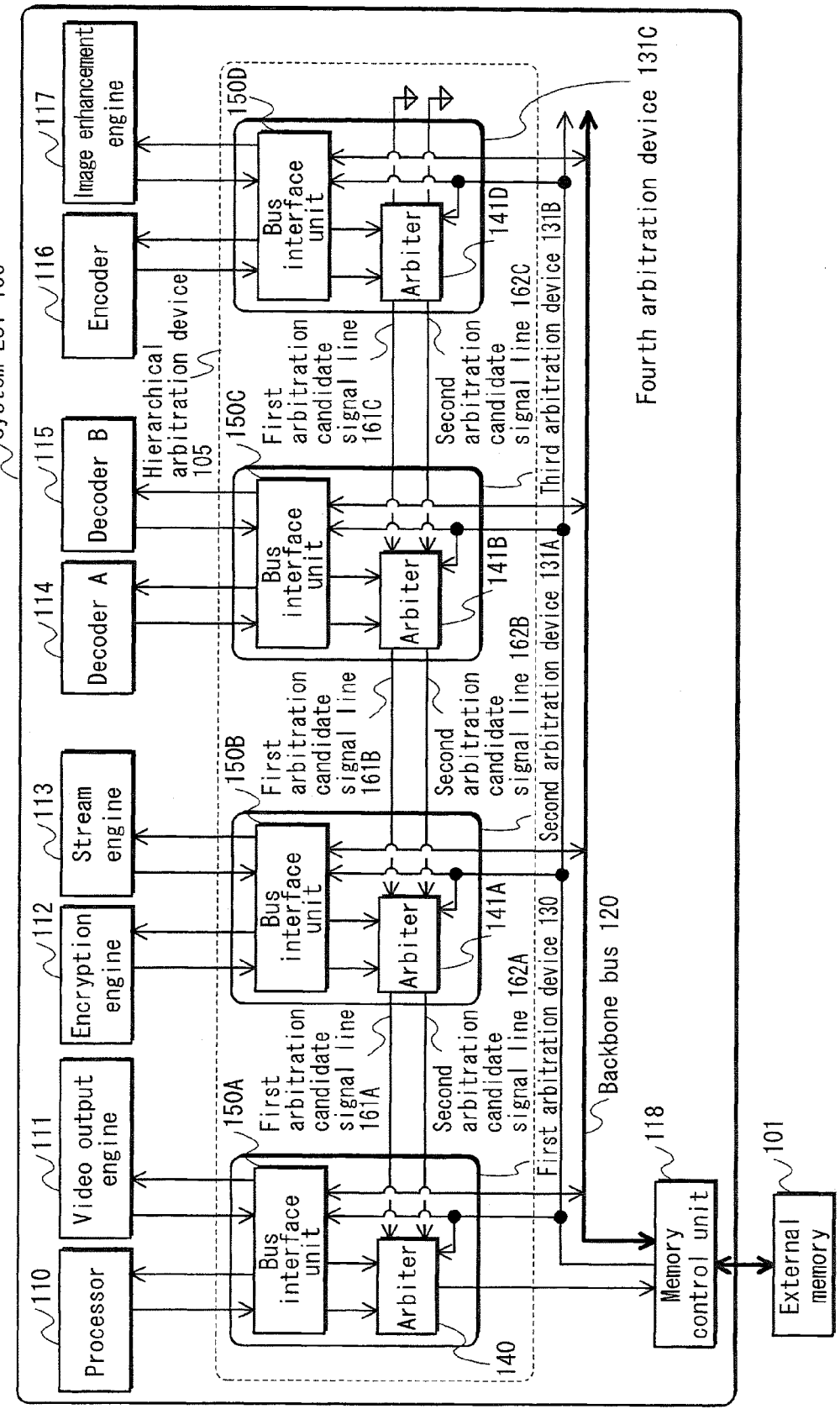
FIG. 1 is a functional block diagram of a system LSI 100.

FIG. 1 is a block diagram showing the configuration of the system LSI 100.

The system LSI 100 is provided with a processor 110, video output engine 111, encryption engine 112, stream engine 113, decoder A 114, decoder B 115, encoder 116, image enhancement engine 117, hierarchical arbitration device 105, memory control unit memory control unit 118, main bus 120, etc. The system LSI 100 is connected to an external memory 101.

The processor 110 is connected to the hierarchical arbitration device 105 and, by executing programs stored in the external memory 101, achieves control of the video output engine 111, encryption engine 112, stream engine 113, decoder A 114, decoder B 115, encoder 116, image enhancement engine 117, hierarchical arbitration device 105, memory control unit 118, etc.

The video output engine 111 is connected to the hierarchical arbitration device 105 and is controlled by the processor 110 to superimpose subtitles, graphics, etc. on movie data or still image data stored in the external memory 101.

The encryption engine 112 is connected to the hierarchical arbitration device 105 and is controlled by the processor 110 to decrypt encrypted data stored in the external memory 101.

The stream engine 113 is connected to the hierarchical arbitration device 105 and is controlled by the processor 110 to perform streaming of stream data received via a tuner (streaming refers to processing of stream data, for example processing to separate audio data and video data from stream data in which audio data and video data converge, thus generating audio stream data and video stream data, which are written in the external memory 101).

The decoder A 114 is connected to the hierarchical arbitration device 105 and is controlled by the processor 110 to decode data in Moving Picture Experts Group (MPEG)-2 format stored in the external memory 101.

The decoder B 115 is connected to the hierarchical arbitration device 105 and is controlled by the processor 110 to decode data in MPEG-4 Advanced Video Coding (AVC) format stored in the external memory 101.

The encoder 116 is connected to the hierarchical arbitration device 105 and is controlled by the processor 110 to encode movie data in MPEG-4 AVC format stored in the external memory 101.

The image enhancement engine 117 is connected to the hierarchical arbitration device 105 and is controlled by the processor 110 to perform image enhancement processing on movie data or still image data stored in the external memory 101 (image enhancement processing is processing to generate enhanced data from movie or still image data, for example by generating data that sharpens the outline of objects).

The processor 110, video output engine 111, encryption engine 112, stream engine 113, decoder A 114, decoder B 115, encoder 116, and image enhancement engine 117 are masters sharing the external memory 101 as a slave.

When each master is to use the external memory 101, i.e. the slave, the master does not immediately use the external memory 101, but rather outputs a memory use request command to the hierarchical arbitration device 105.

Figure 2A:
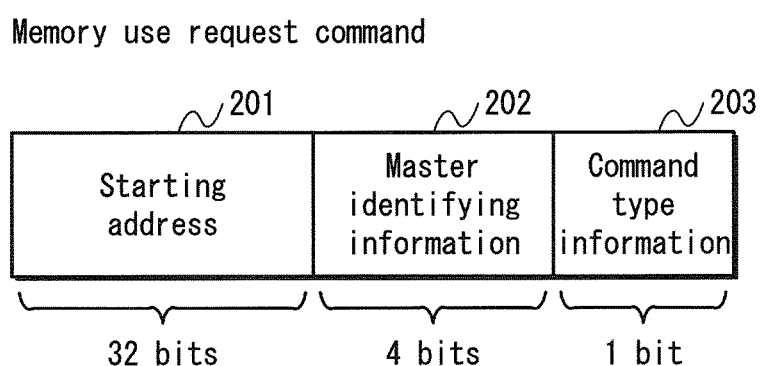
FIG. 2A is a data structure diagram of a memory use request command.

FIG. 2A is a data structure diagram of a memory use request command output by the masters.

As shown in FIG. 2A, the memory use request command includes a starting address 201, master identifying information 202, and command type information 203.

The starting address 201 is 32 bits of data indicating the starting address of the memory region to be used.

The master identifying information 202 is four bits of data for identifying the master that output the memory use request command. For example, "0000" indicates the processor 110, "0001" indicates the video output engine 111, "0010" indicates the encryption engine 112, "0011" indicates the stream engine 113, "0100" indicates the decoder A 114, "0101" indicates the decoder B 115, "0110" indicates the encoder 116, and "0111" indicates the image enhancement engine 117.

The command type information 203 is one bit of data that is set to "0" when the use of the memory is to write to a memory region and to "1" when the use of the memory is to read from a memory region.

Note that the size of the data that each master either writes to or reads from a memory region is a fixed length of 64 bytes.

The following is a continued explanation of the configuration of the system LSI with reference again to FIG. 1.

The main bus 120 is a bidirectional bus connected to the hierarchical arbitration device 105 and the memory control unit 118. The bus width is 32 bytes. Accordingly, the main bus 120 transmits 64 bytes of data in two cycles.

The memory control unit 118 is connected to the hierarchical arbitration device 105 and the external memory 101 and has the following two functions.

Function 1: the memory control unit 118 receives a memory use request command that is output from the hierarchical arbitration device 105 and outputs an acknowledge signal to the hierarchical arbitration device 105.

Function 2: if the main bus 120 and external memory 101 are not in use at the time of receiving a memory use request command output from the hierarchical arbitration device 105, the memory control unit 118 reads data from the external memory 101 or writes data to the external memory 101 in accordance with the received memory use request command.

Figure 2B:
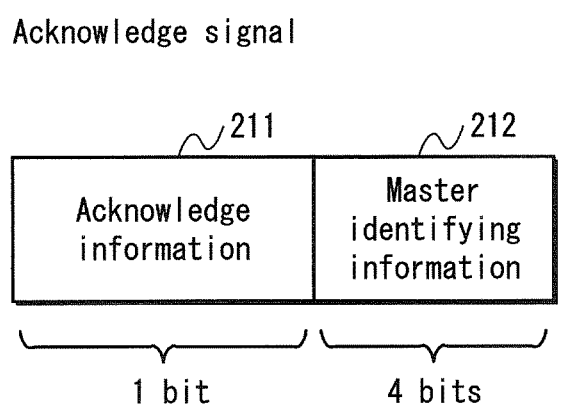
FIG. 2B is a data structure diagram of an acknowledge signal.

FIG. 2B is a data structure diagram of an acknowledge signal output by the memory control unit 118.

As shown in FIG. 2B, the acknowledge signal includes acknowledge information 211 and master identifying information 202.

The acknowledge information 211 is a one-bit signal indicating whether the acknowledge signal is valid. The acknowledge information 211 is set to "1" if the acknowledge signal is valid and to "0" if the acknowledge signal is invalid.

The master identifying information 212 is information for identifying the master that is the source of the acknowledge signal and is the same as the master identifying information 202 included in the memory use request command received before the memory control unit 118 outputs the acknowledge signal.

The following is a continued explanation of the configuration of the system LSI with reference again to FIG. 1.

The hierarchical arbitration device 105 is connected to the processor 110, video output engine 111, encryption engine 112, stream engine 113, decoder A 114, decoder B 115, encoder 116, image enhancement engine 117, main bus 120, and memory control unit 118 and uses each constituent element described below to achieve the following two functions.

Function 1: the hierarchical arbitration device 105 receives and stores memory use request commands from the masters, selects the memory use request command having the highest priority from among the stored memory use request commands, and outputs the memory use request command having the highest priority to the memory control unit 118.

Function 2: the hierarchical arbitration device 105 arbitrates the exchange of data between each master and the main bus 120.

The hierarchical arbitration device 105 includes a first arbitration device 130, second arbitration device 131A, third arbitration device 131B, fourth arbitration device 131C, first arbitration candidate signal line 161A, first arbitration candidate signal line 161B, first arbitration candidate signal line 161C, second arbitration candidate signal line 162A, second arbitration candidate signal line 162B, second arbitration candidate signal line 162C, etc.

The first arbitration device 130 is connected to the processor 110, video output engine 111, memory control unit 118, and main bus 120, is further connected to the second arbitration device 131A via the first arbitration candidate signal line 161A and second arbitration candidate signal line 162A, and includes the following four functions.

Function 1: the first arbitration device 130 receives and stores memory use request commands from the processor 110 and video output engine 111.

Function 2: The first arbitration device 130 selects a memory use request command having the highest priority and a memory use request command having the second highest priority from among the stored memory use request commands, the memory use request command input from the second arbitration device 131A via the first arbitration candidate signal line 161A, and the memory use request command input from the second arbitration device 131A via the second arbitration candidate signal line 162A. The first arbitration device 130 also sets the memory use request command having the highest priority as a top priority memory use request command and outputs the top priority memory use request command to the memory control unit 118 in synchronization with the clock signal.

Function 3: After outputting the memory use request command having the highest priority to the memory control unit 118 as the top priority memory use request, when receiving an acknowledge signal from the memory control unit 118 indicating that the memory use request was received, then if the first arbitration device 130 was storing a memory use request corresponding to the acknowledge signal, the first arbitration device 130 deletes the memory use request. The first arbitration device 130 then outputs, as the top priority memory use request, the memory use request command having the second highest priority that was selected during the clock cycle in which the acknowledge signal was received. The output occurs during the next clock cycle.

Function 4: The first arbitration device 130 functions as a bus interface between the processor 110 and main bus 120, and as a bus interface between the video output engine 111 and main bus 120.

The second arbitration device 131A is connected to the encryption engine 112, stream engine 113, memory control unit 118, main bus 120, etc., and is further connected to the first arbitration device 130 via the first arbitration candidate signal line 161A and second arbitration candidate signal line 162A, as well as to the third arbitration device 131B via the first arbitration candidate signal line 161B and second arbitration candidate signal line 162B. The second arbitration device 131A includes the following four functions.

Function 1: the second arbitration device 131A receives and stores memory use request commands from the encryption engine 112 and stream engine 113.

Function 2: the second arbitration device 131A selects a memory use request command having the highest priority and a memory use request command having the second highest priority from among the stored memory use request commands, the memory use request command input from the third arbitration device 131B via the first arbitration candidate signal line 161B, and the memory use request command input from the third arbitration device 131B via the second arbitration candidate signal line 162B. The second arbitration device 131A also outputs the memory use request command having the highest priority and memory use request command having the second highest priority to the first arbitration device 130 via the first arbitration candidate signal line 161A and the second arbitration candidate signal line 162A, respectively, in synchronization with the clock signal.

Function 3: After outputting the memory use request command having the highest priority to the first arbitration device 130 as the top priority memory use request, when receiving an acknowledge signal from the memory control unit 118 indicating that the memory use request was received, then if the second arbitration device 131A was storing a memory use request corresponding to the acknowledge signal, the second arbitration device 131A deletes the memory use request. The second arbitration device 131A then outputs, as the memory use request command having the highest priority, the memory use request command having the second highest priority that was selected during the clock cycle in which the acknowledge signal was received. The output occurs during the next clock cycle.

Function 4: The second arbitration device 131A functions as a bus interface between the encryption engine 112 and main bus 120, and as a bus interface between the stream engine 113 and main bus 120.

The third arbitration device 131B has the same structure as the second arbitration device 131A, is connected to the decoder A 114, decoder B 115, memory control unit 118, main bus 120, etc., and is further connected to the second arbitration device 131A via the first arbitration candidate signal line 161B and second arbitration candidate signal line 162B, as well as to the fourth arbitration device 131C via the first arbitration candidate signal line 161C and second arbitration candidate signal line 162C.

The fourth arbitration device 131C has the same structure as the second arbitration device 131A and third arbitration device 131B and is connected to the encoder 116, image enhancement engine 117, memory control unit 118, main bus 120, etc.

Note that since no arbitration device exists at a level lower than the fourth arbitration device 131C, no memory use requests are input from a level lower than the fourth arbitration device 131C.

<Structure of Arbitration Devices>

The first arbitration device 130 includes a bus interface unit 150A and arbiter 140. The second arbitration device 131A through the fourth arbitration device 131C respectively include bus interface units 150B-150D and arbiters 141A-141C.

The following is a detailed description, with reference to the drawings, of the structure of the first arbitration device 130 as well as the second arbitration device 131A through fourth arbitration device 131C.

Note that since the second arbitration device 131A through the fourth arbitration device 131C have the same structure, these arbitration devices are simply referred to as arbitration device 131, the bus interface units 150B-150D are simply referred to as bus interface unit 150, and the arbiters 141A-141C are simply referred to as arbiter 141, except for when there is a particular need for distinction.

Furthermore, the bus interface unit 150A has the same structure as the bus interface unit 150. Therefore, in the following description, the bus interface unit 150A is also simply referred to as bus interface unit 150, except for when there is a particular need for distinction.

Figure 3:
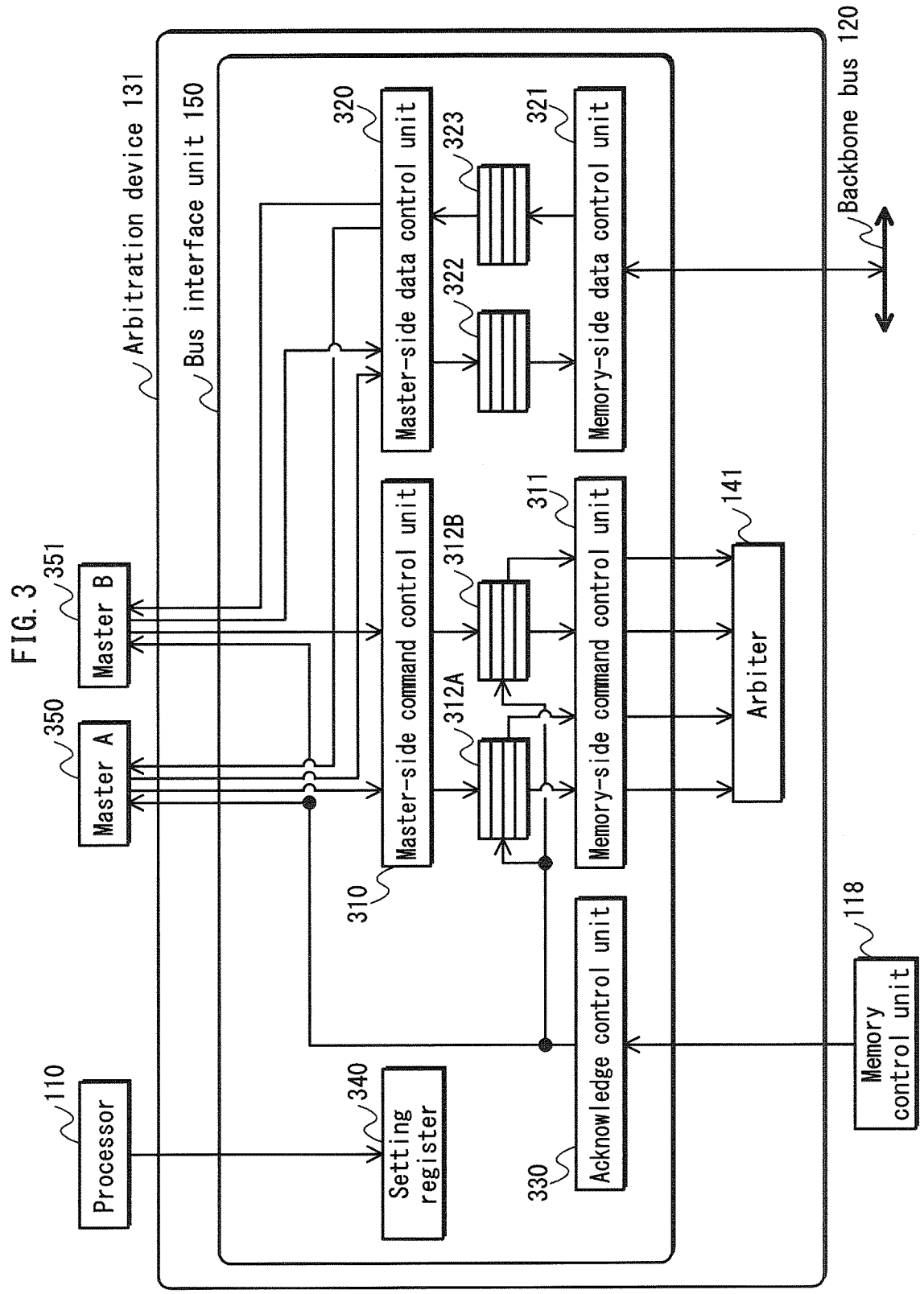
FIG. 3 is a configuration diagram of a bus interface unit 150.

FIG. 3 is a configuration diagram of the bus interface unit 150 in the arbitration device 130 and arbitration device 131.

As shown in FIG. 3, the bus interface unit 150 is connected to a master A 350, a master B 351, the processor 110, memory control unit 118, main bus 120, and arbiter 141 (for example, in the case of the bus interface unit 150B, the master A 350 is the encryption engine 112, and the master B 351 is the stream engine 113). The bus interface unit 150 includes a master-side command control unit 310, memory-side command control unit 311, master-side data control unit 320, memory-side data control unit 321, acknowledge control unit 330, setting register 340, command buffer A 312A, command buffer B 312B, data buffer A 322, and data buffer B 323.

The command buffer A 312A and command buffer B 312B are both connected to the master-side command control unit 310, memory-side command control unit 311, and acknowledge control unit 330, and are buffers for temporarily storing memory use requests output by the master-side command control unit 310.

The master-side command control unit 310 is connected to the master A 350, master B 351, command buffer A 312A, and command buffer B 312B. The master-side command control unit 310 includes the function of receiving a memory use request command from the master A via handshaking and writing the received memory use request command into the command buffer A 312A, as well as the function of receiving a memory use request command from the master B via handshaking and writing the memory use request command into the command buffer B 312B.

The memory-side command control unit 311 is connected to the command buffer A 312A, command buffer B 312B, and arbiter 141, operates in synchronization with the clock signal, and includes the following two functions.

Function 1: when the clock signal rises, the memory-side command control unit 311 reads the oldest memory use request command from the command buffer A 312A and outputs this command to the arbiter 141 as the master A first memory use request command. The memory-side command control unit 311 also reads the second oldest memory use request command and outputs this command to the arbiter 141 as the master A second memory use request command.

Function 2: when the clock signal rises, the memory-side command control unit 311 reads the oldest memory use request command from the command buffer B 312B and outputs this command to the arbiter 141 as the master B first memory use request command. The memory-side command control unit 311 also reads the second oldest memory use request command and outputs this command to the arbiter 141 as the master B second memory use request command.

Note that in functions 1 and 2, if no corresponding memory use request command is stored in the command buffer, the memory-side command control unit 311 outputs a signal with all zeros as the memory use request command to indicate non-existence of a memory use request command.

The data buffer A 322 is a First In, First Out (FIFO) buffer temporarily storing 32-byte long data and is connected to the master-side data control unit 320 and memory-side data control unit 321.

The data buffer B 323 is a FIFO buffer temporarily storing 32-byte long data and is connected to the master-side data control unit 320 and memory-side data control unit 321.

The master-side data control unit 320 is connected to the master A 350, master B 351, data buffer A 322, and data buffer B 323 and includes the following three functions.

Function 1: the master-side data control unit 320 receives data from the master A via handshaking and writes the received data in the data buffer A 322.

Function 2: the master-side data control unit 320 receives data from the master B via handshaking and writes the received data in the data buffer A 322.

Function 3: when data is stored in the data buffer B 323, the master-side data control unit 320 transmits the data via handshaking, in order from the oldest data, to the master that is the destination of the data.

The memory-side data control unit 321 is connected to the data buffer A 322 and data buffer B 323, operates in synchronization with the clock signal, and includes the following two functions.

Function 1: when the clock signal rises, the memory-side data control unit 321 reads the oldest data from among the data stored in the data buffer A 322 and outputs the read data to the main bus 120.

Function 2: at the time of receiving, from the main bus 120, data whose destination is the master A 350 or master B 351, the memory-side data control unit 321 writes the data in the data buffer B 323 when the clock signal rises.

The acknowledge control unit 330 is connected to the command buffer A 312A, command buffer B 312B, master A 350, master B 351, and memory control unit 118 and includes the following two functions.

Function 1: at the time of receiving, from the memory control unit 118, an acknowledge signal that includes master identifying information 212 indicating the master A 350, the acknowledge control unit 330 transmits the acknowledge signal to the master A 350 and deletes the oldest memory use request command stored in the command buffer A 312A.

Function 2: after receiving, from the memory control unit 118, an acknowledge signal that includes master identifying information 212 indicating the master B 351, the acknowledge control unit 330 transmits the acknowledge signal to the master B 351 and deletes the oldest memory use request command stored in the command buffer B 312B.

The setting register 340 is connected to the processor 110 and is controlled by the processor 110 to set the number of memory use request commands that can be temporarily stored in the command buffer A 312A and the command buffer B 312B, as well as the number of pieces of data that can be temporarily stored in the data buffer A 322 and data buffer B 323.

Figure 4:
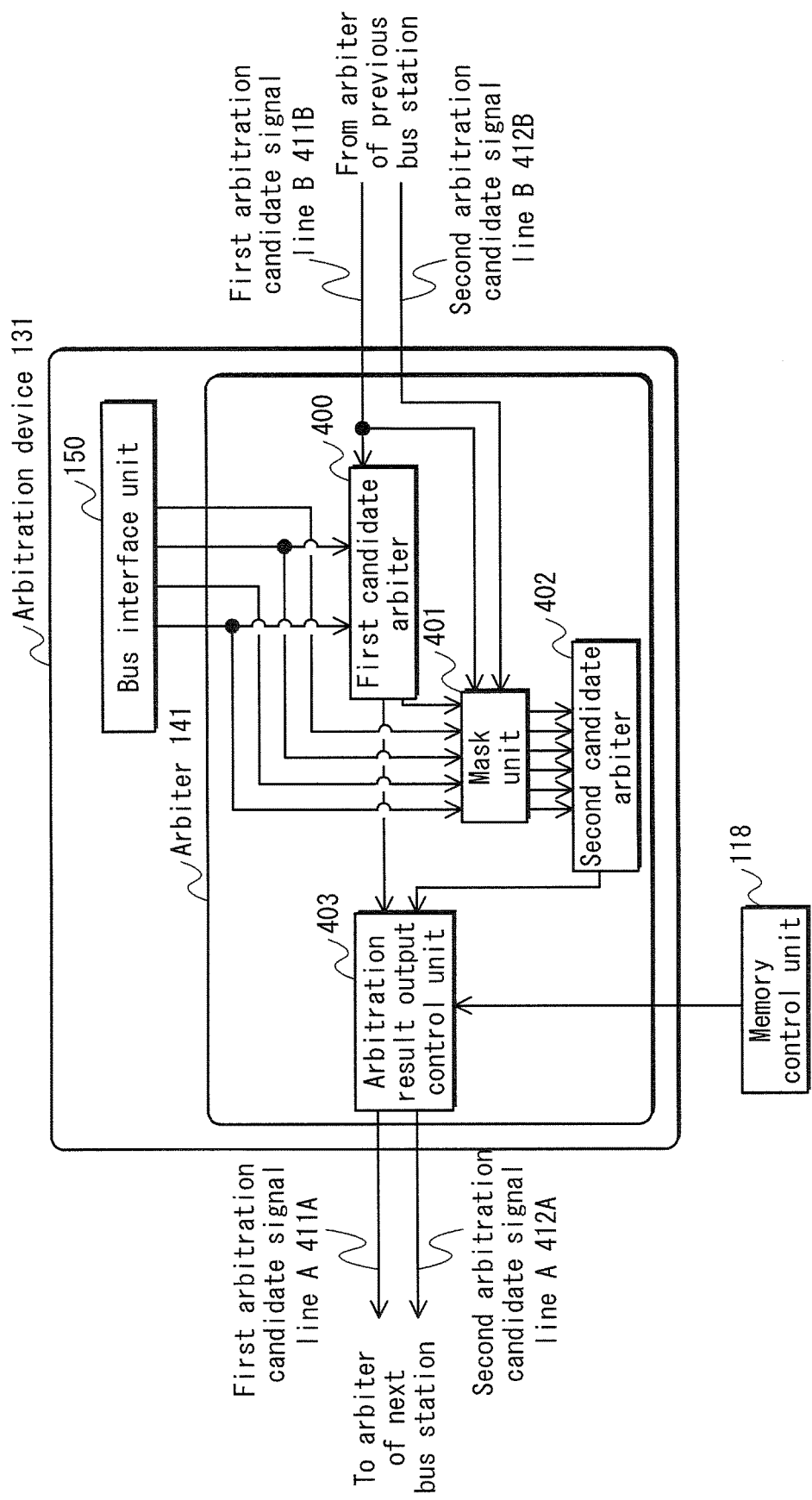
FIG. 4 is a configuration diagram of an arbiter 141.

FIG. 4 is a configuration diagram of the arbiter 141 in the arbitration device 131.

As shown in FIG. 4, the arbiter 141 is connected to the bus interface unit 150 and the memory control unit 118. The arbiter 141 is further connected to the following components, the parenthetical examples being for the case of the arbiter 141A: the higher level arbiter (arbiter 140) via the first arbitration candidate signal line A 411A (first arbitration candidate signal line 161A) and the second arbitration candidate signal line A 412A (second arbitration candidate signal line 162A) as well as to the lower level arbiter (arbiter 141B) via the first arbitration candidate signal line B 411B (first arbitration candidate signal line 161B) and the second arbitration candidate signal line B 412B (second arbitration candidate signal line 162B). The arbiter 141 includes a first candidate arbiter 400, mask unit 401, second candidate arbiter 402, and arbitration result output control unit 403.

The first candidate arbiter 400 is connected to the bus interface unit 150, mask unit 401, arbitration result output control unit 403, and first arbitration candidate signal line B 411B, and receives input of a first arbitration candidate memory use request command (described below) from the first arbitration candidate signal line B 411B, and the master A first memory use request command and the master B first memory use request command from the bus interface unit. Upon input of these three memory use request commands, the first candidate arbiter 400 selects the memory use request command having the highest priority as a first command, outputting the first command to the arbitration result output control unit 403 and mask unit 401.

Figure 5:
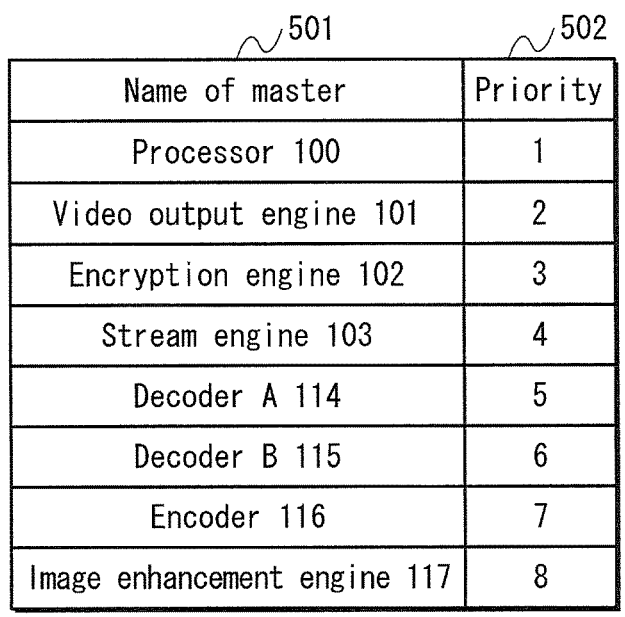
FIG. 5 is a diagram showing masters and a priority ranking of memory use request commands issued by the masters.

FIG. 5 is a table showing masters and a priority ranking of memory use request commands issued by the masters.

A master name 501 indicates the name of the master, and a priority 502 indicates the priority of the memory use request command issued by the master.

The first candidate arbiter 400 is previously set to select the first command in accordance with the priority ranking of the memory use request commands shown in FIG. 5.

The mask unit 401 is connected to the bus interface unit 150, first candidate arbiter 400, second candidate arbiter 402, first arbitration candidate signal line B 411B, and second arbitration candidate signal line B 412B. The mask unit 401 receives input of six memory use request commands the first arbitration candidate memory use request command (described below) from the first arbitration candidate signal line B 411B, second arbitration candidate memory use request command (described below) from the second arbitration candidate signal line B 412B, and master A first memory use request command, master B first memory use request command, master A second memory use request command, and master B second memory use request command from the bus interface unit 150. Upon receiving the memory use request command output by the first candidate arbiter 400, the mask unit 401 outputs five memory use request commands to the second candidate arbiter 402, namely the above six memory use commands with the exception of the memory use request command output by the first candidate arbiter 400.

The second candidate arbiter 402 is connected to the mask unit 401, arbitration result output control unit 403, first arbitration candidate signal line B 411B, and second arbitration candidate signal line B 412B, and selects, from among the five memory use request commands output by the mask unit 401, the memory use request command having the highest priority as a second command, outputting the second command to the arbitration result output control unit 403.

The second candidate arbiter 402 selects the second command in accordance with the priority ranking of memory use request commands shown in FIG. 5. When selecting the second command, the second candidate arbiter 402 ensures that the master A second memory use request command output by the bus interface unit 150 has higher priority than the master B second memory use request command output by the bus interface unit 150. The second candidate arbiter 402 also ensures that when the first arbitration candidate memory use request command (described below) output by the first arbitration candidate signal line B 411B and the second arbitration candidate memory use request command (described below) output by the second arbitration candidate signal line B 412B are memory use request commands output by the same master, the first arbitration candidate memory use request command has higher priority.

The arbitration result output control unit 403 is connected to the first candidate arbiter 400, second candidate arbiter 402, memory control unit 118, first arbitration candidate signal line A 411A, and second arbitration candidate signal line A 412A, operates in synchronization with the clock signal, and includes the following two functions.

Function 1: after receiving the first command from the first candidate arbiter 400 and the second command from the second candidate arbiter 402, when during the clock cycle in which these commands are received, the arbitration result output control unit 403 does not receive from the memory control unit 118 an acknowledge signal that includes master identifying information included in the first command, then when the next clock signal rises, the arbitration result output control unit 403 outputs the first command to the first arbitration candidate signal line A 411A as the first arbitration candidate memory use request command and outputs the second command to the second arbitration candidate signal line A 412A as the second arbitration candidate memory use request command.

Function 2: after receiving the first command from the first candidate arbiter 400 and the second command from the second candidate arbiter 402, when during the clock cycle in which these commands are received, the arbitration result output control unit 403 receives from the memory control unit 118 an acknowledge signal that includes master identifying information included in the first command, then when the next clock signal rises, the arbitration result output control unit 403 outputs the second command to the first arbitration candidate signal line A 411A as the first arbitration candidate memory use request command and outputs a signal with all zeros to the second arbitration candidate signal line A 412A as the second arbitration candidate memory use request command.

Figure 6:
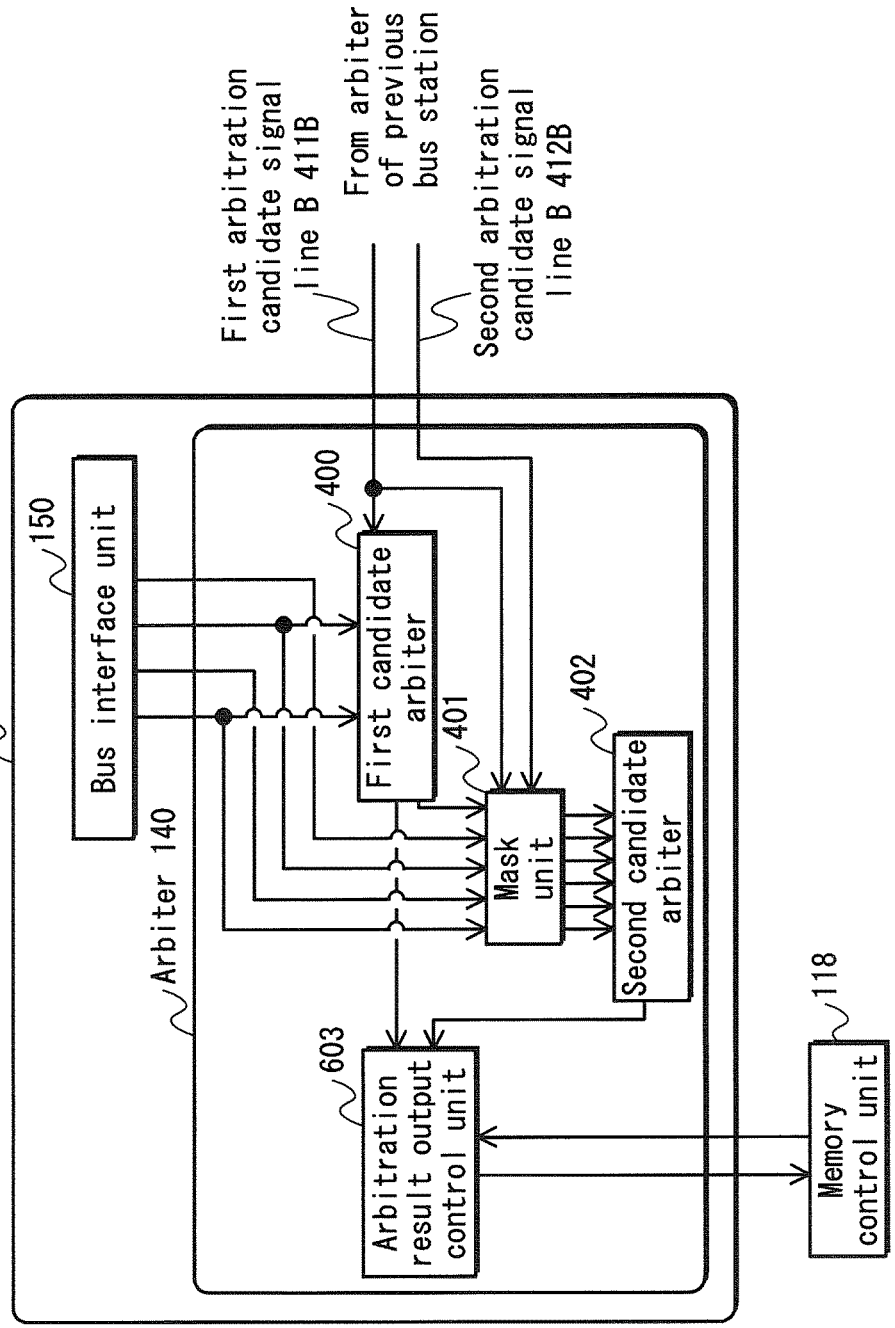
FIG. 6 is a configuration diagram of an arbiter 140.

FIG. 6 is a configuration diagram of the arbiter 140 in the arbitration device 130.

The arbiter 140 differs from the arbiter 141 in that the arbitration result output control unit 403 is changed to an arbitration result output control unit 603.

The following is a description of the difference between the arbiter 140 and the arbiter 141, i.e. the arbitration result output control unit 603.

The arbitration result output control unit 603 is connected to the first candidate arbiter 400, second candidate arbiter 402, and memory control unit 118, operates in synchronization with the clock signal, and includes the following two functions.

Function 1: after receiving the first command from the first candidate arbiter 400 and the second command from the second candidate arbiter 402, when during the clock cycle in which these commands are received, the arbitration result output control unit 603 does not receive from the memory control unit 118 an acknowledge signal that includes master identifying information included in the first command, then when the next clock signal rises, the arbitration result output control unit 603 outputs the first command to the memory control unit 118 as the top priority memory use request command.

Function 2: after receiving the first command from the first candidate arbiter 400 and the second command from the second candidate arbiter 402, when during the clock cycle in which these commands are received, the arbitration result output control unit 603 receives from the memory control unit 118 an acknowledge signal that includes master identifying information included in the first command, then when the next clock signal rises, the arbitration result output control unit 603 outputs the second command to the memory control unit 118 as the top priority memory use request command.

The following is a description, with reference to the drawings, of the operations of the system LSI 100 with the above configuration.

<Operations>

Among the operations of the system LSI 100, the following is a description of representative operations, namely arbitration by hierarchical level by the arbitration device 131, final arbitration by the first arbitration device 130, and arbitration by the hierarchical arbitration device 105.

<Arbitration by Hierarchical Level>

Figure 7:
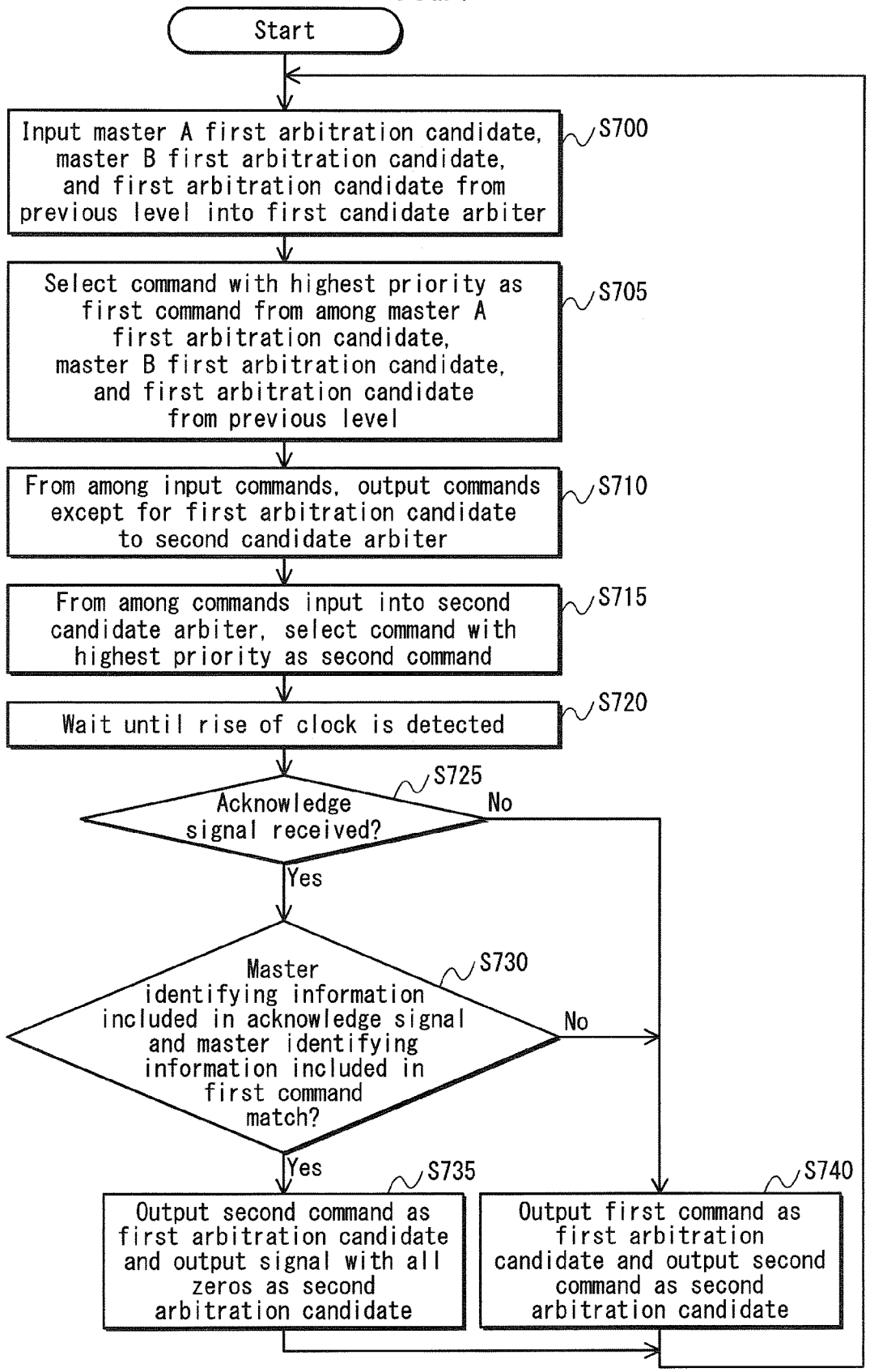
FIG. 7 is a flowchart showing arbitration by hierarchical level.

FIG. 7 is a flowchart showing arbitration by hierarchical level performed by the arbitration device 131.

Arbitration by hierarchical level is processing whereby the arbitration device 131 arbitrates memory use request commands at the level to which the device belongs and, as the result of arbitration, outputs a first arbitration candidate memory use request command and a second arbitration candidate memory use request command to the arbitration device that is one level higher.

Arbitration by hierarchical level is performed in synchronization with the clock signal and starts when the clock signal rises.

When the clock signal rises, the first candidate arbiter 400 receives the master A first memory use request command and master B first memory use request command output by the memory-side command control unit 311 and receives the first arbitration candidate memory use request command output by the arbitration result output control unit 403 of the arbitration device 131 at the next lower level (step S700). The mask unit 401 receives the master A first memory use request command, master A second memory use request command, master B first memory use request command, and master B second memory use request command output by the memory-side command control unit 311 and receives the first arbitration candidate memory use request command and second arbitration candidate memory use request command output by the arbitration result output control unit 403 of the arbitration device 131 at the next lower level.

Upon input of the master A first memory use request command, master B first memory use request command, and first arbitration candidate memory use request command, the first candidate arbiter 400 selects, from among these three memory use request commands, the memory use request command having the highest priority as the first command, outputting the first command to the arbitration result output control unit 403 and mask unit 401 (step S705).

Upon input of the first command, the mask unit 401 selects five memory use request commands from among already input memory use request commands, namely the master A first memory use request command, master A second memory use request command, master B first memory use request command, master B second memory use request command, master A first memory use request command, master A second memory use request command, master B first memory use request command, and master B second memory use request command, with the exception of the memory use request command that matches the input first command. The mask unit 401 outputs the selected five memory use request commands to the second candidate arbiter 402 (step S710).

Upon input of the five memory use request commands, the second candidate arbiter 402 selects the memory use request command having the highest priority among the five commands, outputting the selected command to the arbitration result output control unit 403 as the second command (step S715).

Upon receiving input of the first command from the first candidate arbiter 400 and of the second command from the second candidate arbiter 402, the arbitration result output control unit 403 waits until the rise of the next clock signal (step S720).

If the arbitration result output control unit 403 receives an acknowledge signal from the memory control unit 118 while waiting between the rise of a clock signal until the rise of the next clock signal (step S725: Yes), and if the master identifying information included in the acknowledge signal matches the master identifying information included in the received first command (step S730: Yes), then when the next clock signal rises, the arbitration result output control unit 403 outputs, to the arbitration device 131 at the next level, the received second command as the first arbitration candidate memory use request command and a signal with all zeros, indicating non-existence of a memory use request command, as the second arbitration candidate memory use request command (step S735).

In step S725, if the arbitration result output control unit 403 does not receive an acknowledge signal from the memory control unit 118 while waiting between the rise of a clock signal until the rise of the next clock signal (step S725: No), or in step S730, if the master identifying information included in the acknowledge signal does not match the master identifying information included in the received first command (step S730: No), then when the next clock signal rises, the arbitration result output control unit 403 outputs, to the arbitration device 131 at the next level, the received first command as the first arbitration candidate memory use request command and the received second command as the second arbitration candidate memory use request command (step S740).

When processing in step S735 or step S740 is complete, the arbitration device 131 returns to step S700 and again performs processing starting with step S700.

<Final Arbitration>

Figure 8:
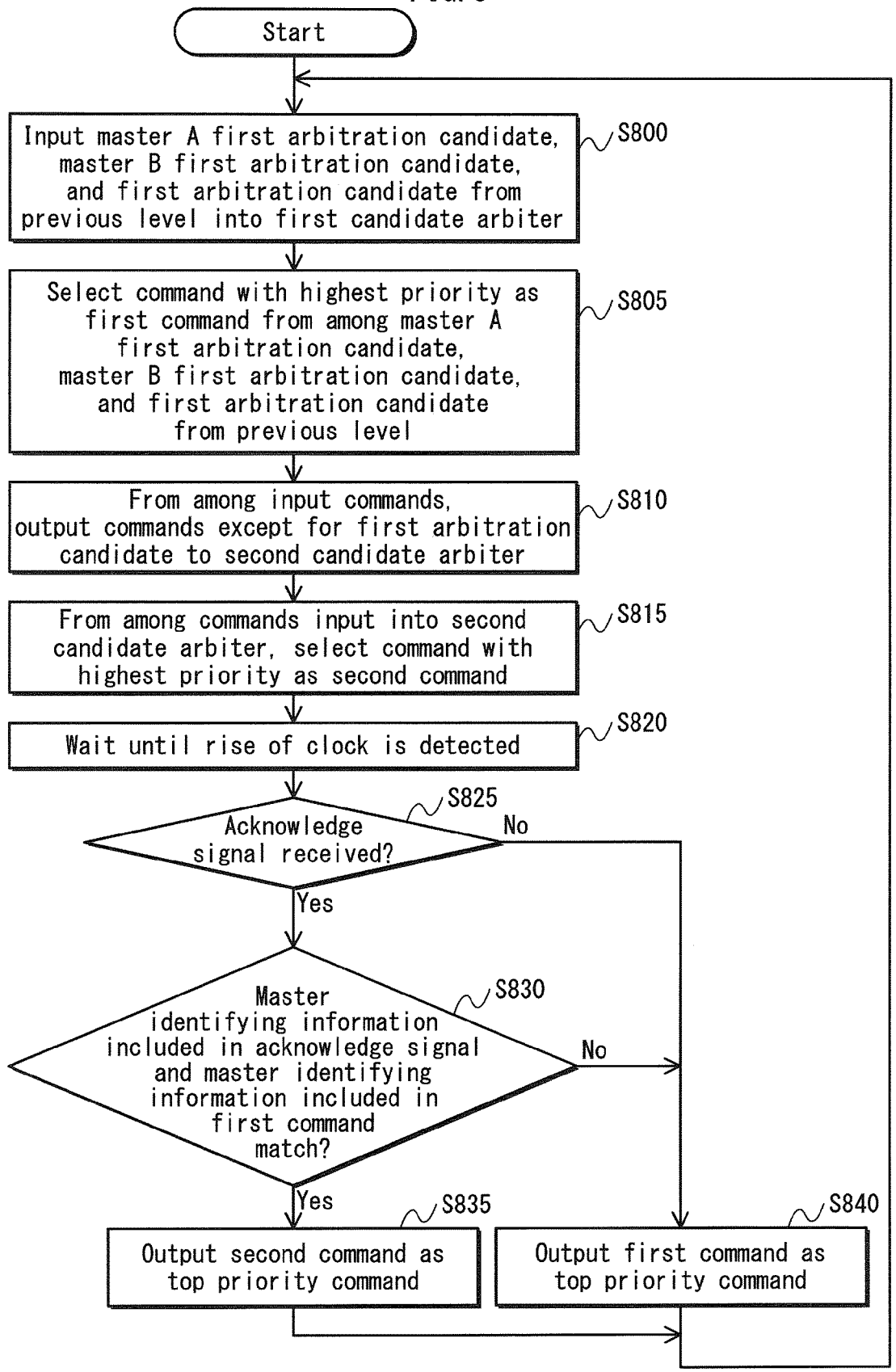
FIG. 8 is a flowchart showing final arbitration.

FIG. 8 is a flowchart showing final arbitration performed by the arbitration device 130.

Final arbitration is processing wherein the arbitration device 130 arbitrates memory use request commands at the highest level, to which the arbitration device 130 belongs, and as the result of arbitration, outputs a top priority memory use request command to the memory control unit 118.

During final arbitration, processing from step S800 through step S830 is the same as processing from step S700 through step S730 during the arbitration by hierarchical level, replacing the arbitration result output control unit 403 with the arbitration result output control unit 603. Accordingly, a description of the processing in these steps is omitted.

In step S830, if the master identifying information included in the received acknowledge signal matches the master identifying information included in the first command (step S830: Yes), then when the next clock signal rises, the arbitration result output control unit 603 outputs the received second command to the memory control unit 118 as the top priority memory use request command (step S835).

In step S825, the arbitration result output control unit 603 may not receive an acknowledge signal from the memory control unit 118 while waiting until the rise of the next clock signal (step S825: No). In step S830, the master identifying information included in the acknowledge signal may not match the master identifying information included in the received first command (step S830: No). In either case of these two cases, when the next clock signal rises, the arbitration result output control unit 603 outputs the received first command to the memory control unit 118 as the top priority memory use request command (step S840).

When processing in step S835 or step S840 is complete, the arbitration device 130 returns to step S800 and again performs processing starting with step S800.

<Arbitration>

The following is a description of arbitration performed by the hierarchical arbitration device 105, with reference to the drawings and using a specific example.

Figure 9:
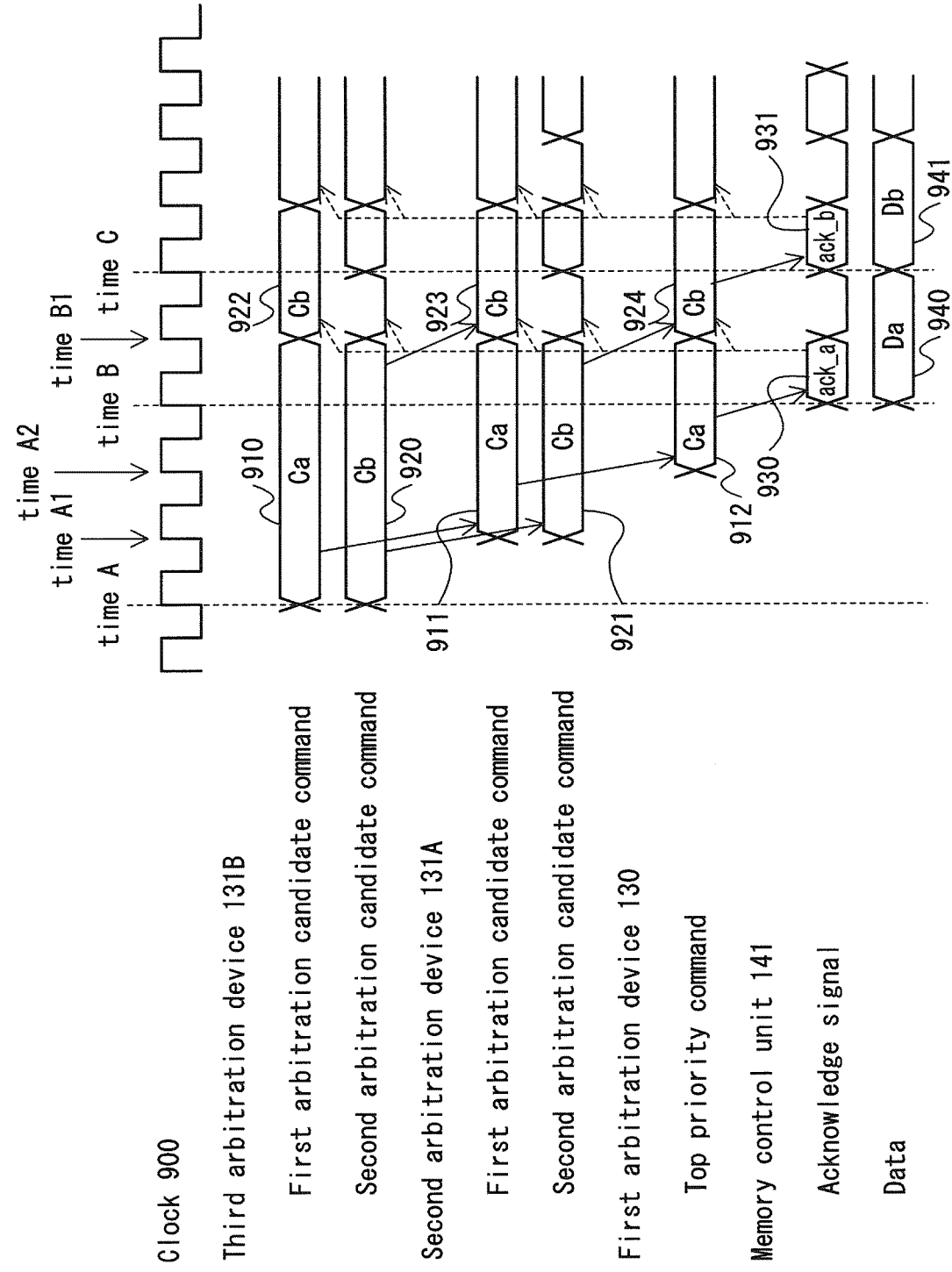
FIG. 9 is a timing chart of internal signals in the system LSI 100.

FIG. 9 is a timing chart of internal signals in the system LSI 100 for a specific example illustrating arbitration.

In this specific example, at time A, the third arbitration device 131B outputs a command Ca 910 (read request command to read the external memory 101) as the first arbitration candidate memory use request command and a command Cb 920 (read request command to read the external memory 101) as the second arbitration candidate memory use request command. During the period from time A to time C, no master issues any new memory use request commands.

At time A, the third arbitration device 131B outputs the command Ca 910 as the first arbitration candidate memory use request command and the command Cb 920 as the second arbitration candidate memory use request command to the second arbitration device 131A. At time A1, i.e. when the next clock signal rises, the second arbitration device 131A outputs a command Ca 911 as the first arbitration candidate memory use request command and a command Cb 921 as the second arbitration candidate memory use request command to the first arbitration device 130.

At time A2, the first arbitration device 130 outputs a command Ca 912 to the memory control unit 118 as the top priority command.

At time B, the memory control unit 118 outputs an acknowledge signal ack_a 930, which includes master identifying information included in the command Ca 912, to all of the arbitration devices. Furthermore, over two cycles the memory control unit 118 reads data Da 940 stored in a 64-byte memory region in the external memory 101 at the starting address included in the command Ca 912 and outputs, over two cycles, the data Da 940 to the main bus 120, which has a 32-byte bus width.

Between time B and time B1, all of the arbitration devices 130 receive the acknowledge signal ack_a 930 output by the memory control unit 118.

Having received the acknowledge signal ack_a 930 from the memory control unit 118, at time B1 the first arbitration device 130 switches the top priority command from the command Ca 912 to a command Cb 924 and outputs the top priority command.

At time C, the memory control unit 118 outputs an acknowledge signal ack_b 931, which includes master identifying information included in the command Cb 924, to all of the arbitration devices. Furthermore, over two cycles the memory control unit 118 reads data Db 941 stored in a 64-byte memory region in the external memory 101 at the starting address included in the command Cb 924 and outputs, over two cycles, the data Db 941 to the main bus 120, which has a 32-byte bus width.

The memory control unit 118 thus consecutively reads, from the external memory 101, data Da 940 and data Db 941 and outputs the data to the main bus 120. Therefore, the bubble phenomenon does not occur in the external memory 101 between output of the data Da 940 and output of the data Db 941.

<Conventional Arbitration>

In order to explain the differences between arbitration performed by the hierarchical arbitration device 105 and conventional arbitration performed by a conventional hierarchical arbitration device, the following is a specific example of conventional arbitration performed by a conventional hierarchical arbitration device with reference to the drawings.

In this example, conventional arbitration performed by a conventional hierarchical arbitration device is defined as arbitration in which functionality of the arbitration device 130 and arbitration devices 131A-131C that compose the hierarchical arbitration device 105 is limited. Specifically, these arbitration devices output, from among received memory use requests, only the memory use request having the highest priority to the arbitration device at the next higher level and do not output the memory use request having the second highest priority.

Figure 10:
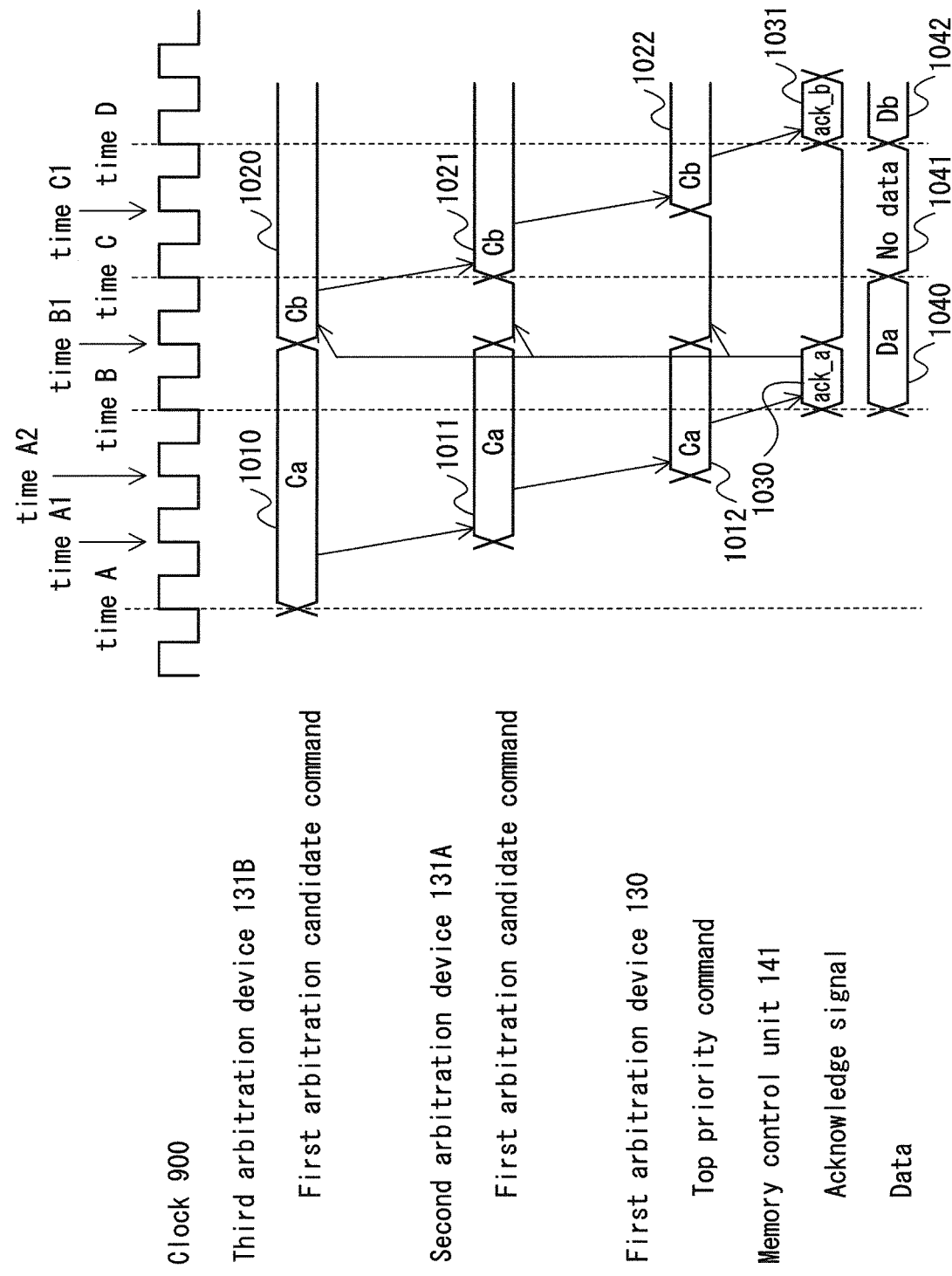
FIG. 10 is a timing chart of internal signals in the system LSI 100 when the functionality of each arbitration device is restricted.

FIG. 10 is a timing chart of internal signals in a system LSI 100 for a specific example illustrating arbitration. This system LSI 100 includes the arbitration device 130 and arbitration devices 131A-131C that have limited functionality.

In this specific example, at time A, the third arbitration device 131B with limited functionality outputs a command Ca 1010 (read request command to read the external memory 101) as the first arbitration candidate memory use request command. During the period from time A to time C, no master issues any new memory use request commands.

While the third arbitration device 131B with limited functionality stores, at time A, a command Cb that is lower priority than command Ca, due to its limited functionality the third arbitration device 131B is unable to output the command Cb as the second arbitration memory use request command.

At time A, the third arbitration device 131B with limited functionality outputs the command Ca 1010 as the first arbitration candidate command to the second arbitration device 131A with limited functionality. At time A1, the second arbitration device 131A with limited functionality outputs a command Ca 1011 as the first arbitration candidate command to the first arbitration device 130 with limited functionality.

At time A2, the first arbitration device 130 with limited functionality outputs a command Ca 1012 to the memory control unit 118 as the top priority command.

At time B, the memory control unit 118 outputs an acknowledge signal ack_a 1030, which includes master identifying information included in the command Ca 1012, to all of the arbitration devices with limited functionality. Furthermore, over two cycles the memory control unit 118 reads data Da 1040 stored in a 64-byte memory region in the external memory 101 at the starting address included in the command Ca 1012 and outputs the data Da 1040 to the main bus 120.

Having received the acknowledge signal ack_a 1030 from the memory control unit 118, at time B1 the third arbitration device 131B with limited functionality outputs a command Cb 1020.

After the third arbitration device 131B with limited functionality outputs the command Cb 1020 as the first arbitration candidate command to the second arbitration device 131A with limited functionality, the second arbitration device 131A with limited functionality outputs a command Cb 1021 at time C as the first arbitration candidate command to the first arbitration device 130 with limited functionality.

At time C1, the first arbitration device 130 with limited functionality outputs a command Cb 1022 to the memory control unit 118 as the top priority command.

At time D, the memory control unit 118 outputs an acknowledge signal ack_b 1031, which includes master identifying information included in the command Cb 1022, to all of the arbitration devices with limited functionality. Furthermore, over two cycles the memory control unit 118 reads data Db 1042 stored in a 64-byte memory region in the external memory 101 at the starting address included in the command Cb 1022 and outputs the data Db 1042 to the main bus 120.

A period that is two cycles long and in which data is not output thus occurs between when the memory control unit 118 reads the data Da 1040 and the data Db 1042 from the external memory 101 (i.e. a two-cycle bubble phenomenon occurs).

In other words, a bubble phenomenon occurs for the two cycles that are the difference between (i) the four cycles from output of one arbitration result until output of the next arbitration result by the third arbitration device 131B with limited functionality (i.e. the latency of the third arbitration device 131B with limited functionality) and (ii) the two cycles during which the master uses the external memory 101.

<Summary>

With the above system LSI 100, if for example the period from output of one set of arbitration results until output of the next set of arbitration results by the third arbitration device 131B (i.e. the latency of the third arbitration device 131B) is four cycles as shown in the specific example, then even if the period during which a master uses the external memory 101 is two cycles, the bubble phenomenon occurring with a conventional configuration no longer occurs. Therefore, the above system LSI 100 reduces occurrence of the bubble phenomenon as compared to a conventional configuration.

While it is possible to increase the data size from 64 bytes to, for example, 128 bytes, such a measure would increase the capacity of the data buffer in the bus interface unit, thereby increasing necessary circuit area. Moreover, a data size of 128 bytes would mean that masters occupy the external memory for four cycles. Therefore, performance would be reduced for a master such as the processor, which has a high priority and whose performance is directly affected by a short data response time after the start of an access request.

Each master in the system LSI 100 thus uses the external memory 101 more efficiently than in a conventional configuration.

Since this system LSI 100 is provided with a master that has functions related to image processing and can efficiently use the external memory 101, this system LSI 100 is useful in systems that perform image processing with the use of memory, such as a Blu-ray recorder system.

Embodiment 2

The following describes, as Embodiment 2 of an arbitration device according to the present invention, a first modified system LSI that is a partial modification of the system LSI 100 according to Embodiment 1.

If in an arbitration device in the first modified system LSI the time lag between (i) output of the first arbitration memory use request command and (ii) receipt of an acknowledge signal that is a response signal corresponding to the first arbitration memory use request command is equal to or greater than a predetermined time, the arbitration device outputs a signal with all zeros as the second arbitration memory use request command.

This structure is adopted because the above bubble phenomenon does not occur even if an arbitration device does not output a second arbitration memory use request command, as long as the number of clock cycles for which a master uses the memory is equal to or greater than the number of clock cycles from when the arbitration device outputs the first arbitration memory use request command until the arbitration device receives an acknowledge signal that is a response signal corresponding to the first arbitration memory use request command and outputs the next first arbitration memory use request command.

The following describes the configuration of the first modified system LSI according to Embodiment 2 with reference to the drawings, focusing on the differences with the system LSI 100 according to Embodiment 1.

<Configuration>

The differences between the first modified system LSI according to Embodiment 2 and the system LSI according to Embodiment 1 are (1) that the arbitration device 131 is changed to an arbitration device 1131, and (2) that the size of data written to and read from a memory region by each master is changed from a fixed length of 64 bytes to a fixed length of 96 bytes.

Since the bus width of the main bus 120 is 32 bytes, the main bus 120 transfers 96 bytes of data over three cycles.

Figure 11:
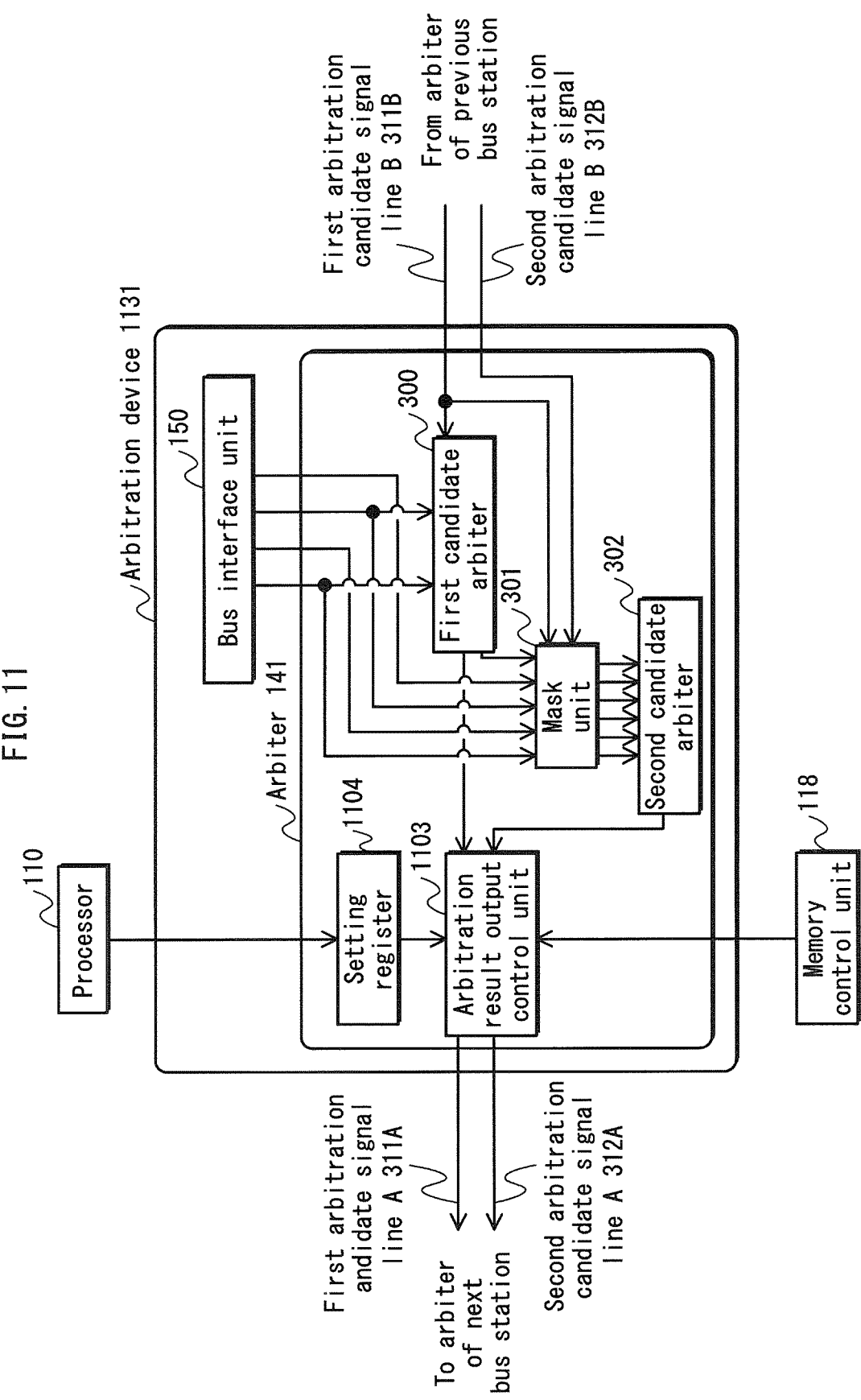
FIG. 11 is a configuration diagram of an arbitration device 1131.

FIG. 11 is a configuration diagram of the arbitration device 1131.

The arbitration device 1131 is a partial modification of the arbitration device 131 in Embodiment 1, in which the arbiter 141 in the arbitration device 131 is replaced with an arbiter 1141.

The arbiter 1141 is a partial modification of the arbiter 141 in Embodiment 1, in which a setting register 1104 is added to the arbiter 141, and the arbitration result output control unit 403 is replaced with an arbitration result output control unit 1103.

The setting register 1104 is connected to the processor 110 and arbitration result output control unit 1103 and has a function to store a number of clock cycles set by the processor 110.

When the arbitration device 1131 to which the arbiter 1141 belongs outputs a first arbitration memory use request command and receives an acknowledge signal that is a response signal corresponding to the first arbitration memory use request command, the number of clock cycles set by the processor 110 refers to the number of clock cycles necessary from output of the first arbitration memory use request command until receipt of the acknowledge signal.

The arbitration result output control unit 1103 is connected to the first candidate arbiter 400, second candidate arbiter 402, memory control unit 118, first arbitration candidate signal line A 411A, second arbitration candidate signal line A 412A, and setting register 1104, operates in synchronization with the clock signal, and includes the following three functions.

Function 1: after receiving the first command from the first candidate arbiter 400 and the second command from the second candidate arbiter 402, when during the clock cycle in which these commands are received, the arbitration result output control unit 1103 does not receive from the memory control unit 118 an acknowledge signal that includes master identifying information included in the first command, and furthermore when the number of clock cycles set in the setting register 1104 is equal to or greater than a predetermined value of four, then when the next clock signal rises, the arbitration result output control unit 1103 outputs the first command to the first arbitration candidate signal line A 411A as the first arbitration candidate memory use request command and outputs the second command to the second arbitration candidate signal line A 412A as the second arbitration candidate memory use request command.

Function 2: after receiving the first command from the first candidate arbiter 400 and the second command from the second candidate arbiter 402, when during the clock cycle in which these commands are received, the arbitration result output control unit 1103 does not receive from the memory control unit 118 an acknowledge signal that includes master identifying information included in the first command, and furthermore when the number of clock cycles set in the setting register 1104 is not equal to or greater than a predetermined value of four, then the arbitration result output control unit 1103 outputs the first command to the first arbitration candidate signal line A 411A as the first arbitration candidate memory use request command and outputs a signal with all zeros to the second arbitration candidate signal line A 412A as the second arbitration candidate memory use request command.

Function 3: after receiving the first command from the first candidate arbiter 400 and the second command from the second candidate arbiter 402, when during the clock cycle in which these commands are received, the arbitration result output control unit 1103 receives from the memory control unit 118 an acknowledge signal that includes master identifying information included in the first command, then when the next clock signal rises, the arbitration result output control unit 1103 outputs the second command to the first arbitration candidate signal line A 411A as the first arbitration candidate memory use request command and outputs a signal with all zeros to the second arbitration candidate signal line A 412A as the second arbitration candidate memory use request command.

The following is a description, with reference to the drawings, of the operations of the first modified system LSI with the above configuration.

<Operations>

Among the operations of the first modified system LSI, the following is a description of representative operations, namely first modified arbitration by hierarchical level by the arbitration device 1131 and first modified arbitration by the hierarchical arbitration device according to Embodiment 2.

<First Modified Arbitration by Hierarchical Level>

First modified arbitration by hierarchical level is a partial modification of the arbitration by hierarchical level performed by the arbitration device 131.

Figure 12:
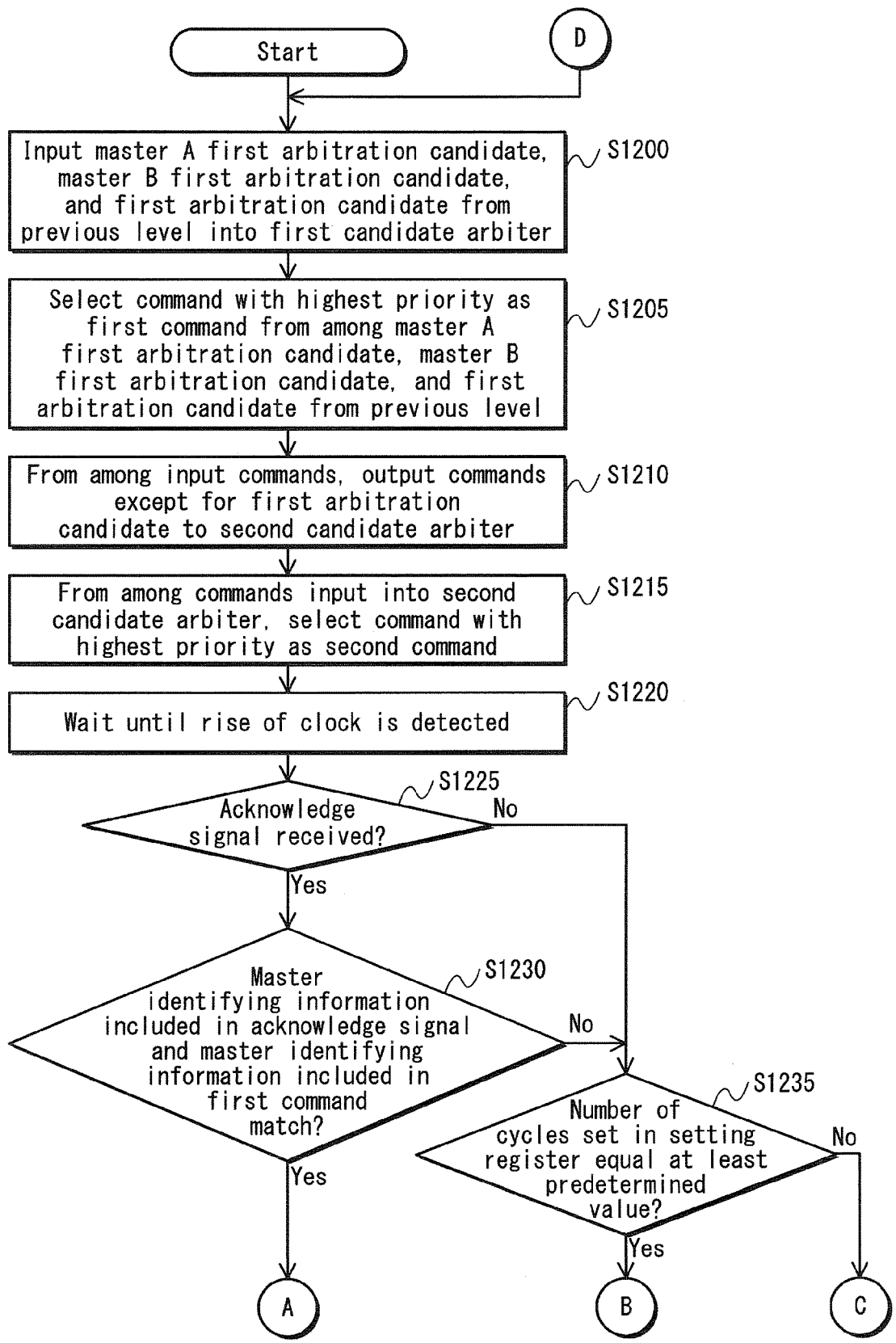
FIG. 12 is part 1 of a flowchart showing first modified arbitration by hierarchical level.
Figure 13:
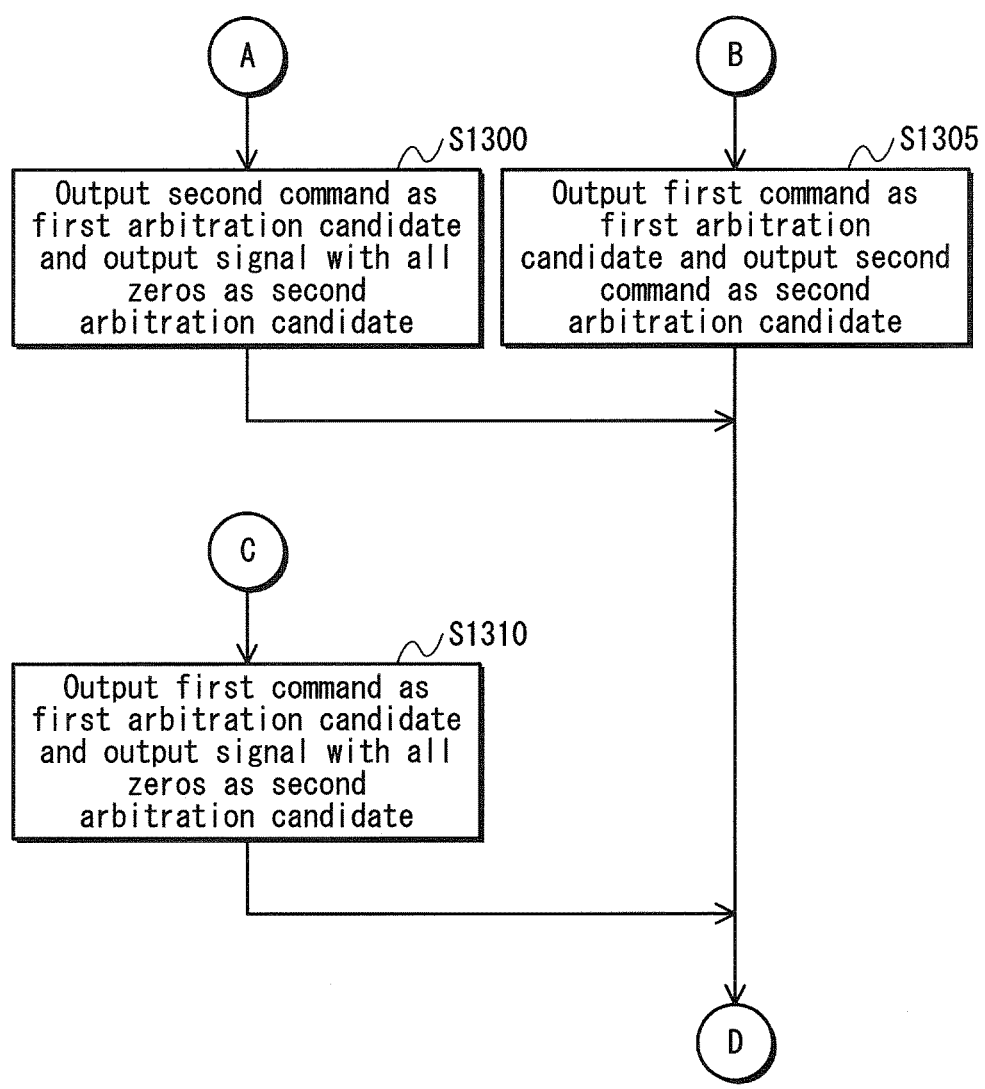
FIG. 13 is part 2 of the flowchart showing first modified arbitration by hierarchical level.

FIGS. 12 and 13 are a flowchart showing the first modified arbitration by hierarchical level performed by the arbitration device 1131.

During the first modified arbitration by hierarchical level, processing from step S1200 through step S1230 is the same as processing from step S700 through step S730 during the arbitration by hierarchical level, replacing the arbitration result output control unit 403 with the arbitration result output control unit 1103. Accordingly, a description of the processing in these steps is omitted.

In step S1230, if the master identifying information included in the received acknowledge signal matches the master identifying information included in the first command (step S1230: Yes), then when the next clock signal rises, the arbitration result output control unit 1103 outputs, to the arbitration device 1131 at the next level, the received second command as the first arbitration candidate memory use request command and a signal with all zeros, indicating non-existence of a memory use request command, as the second arbitration candidate memory use request command (step S1300).

In step S1225, if the arbitration result output control unit 1103 does not receive an acknowledge signal from the memory control unit 118 while waiting until the rise of the next clock signal (step S1225: No), or in step S1230, if the master identifying information included in the acknowledge signal does not match the master identifying information included in the received first command (step S1230: No), then the arbitration result output control unit 1103 checks whether the number of clock cycles set in the setting register 1104 is equal to or greater than a predetermined value of four (step S1235).

In step S1235, if the number of clock cycles set in the setting register 1104 is equal to or greater than four (step S1235: Yes), then when the next clock signal rises, the arbitration result output control unit 1103 outputs, to the arbitration device 1131 at the next level, the received first command as the first arbitration candidate memory use request command and the received second command as the second arbitration candidate memory use request command (step S1305).

In step S1235, if the number of clock cycles set in the setting register 1104 is not equal to or greater than four (step S1235: No), then when the next clock signal rises, the arbitration result output control unit 1103 outputs, to the arbitration device 1131 at the next level, the received first command as the first arbitration candidate memory use request command and a signal with all zeros, indicating non-existence of a memory use request command, as the second arbitration candidate memory use request command (step S1310).

<First Modified Arbitration>

The following is a description of the first modified arbitration performed by the hierarchical arbitration device according to Embodiment 2, with reference to the drawings and using a specific example.

Figure 14:
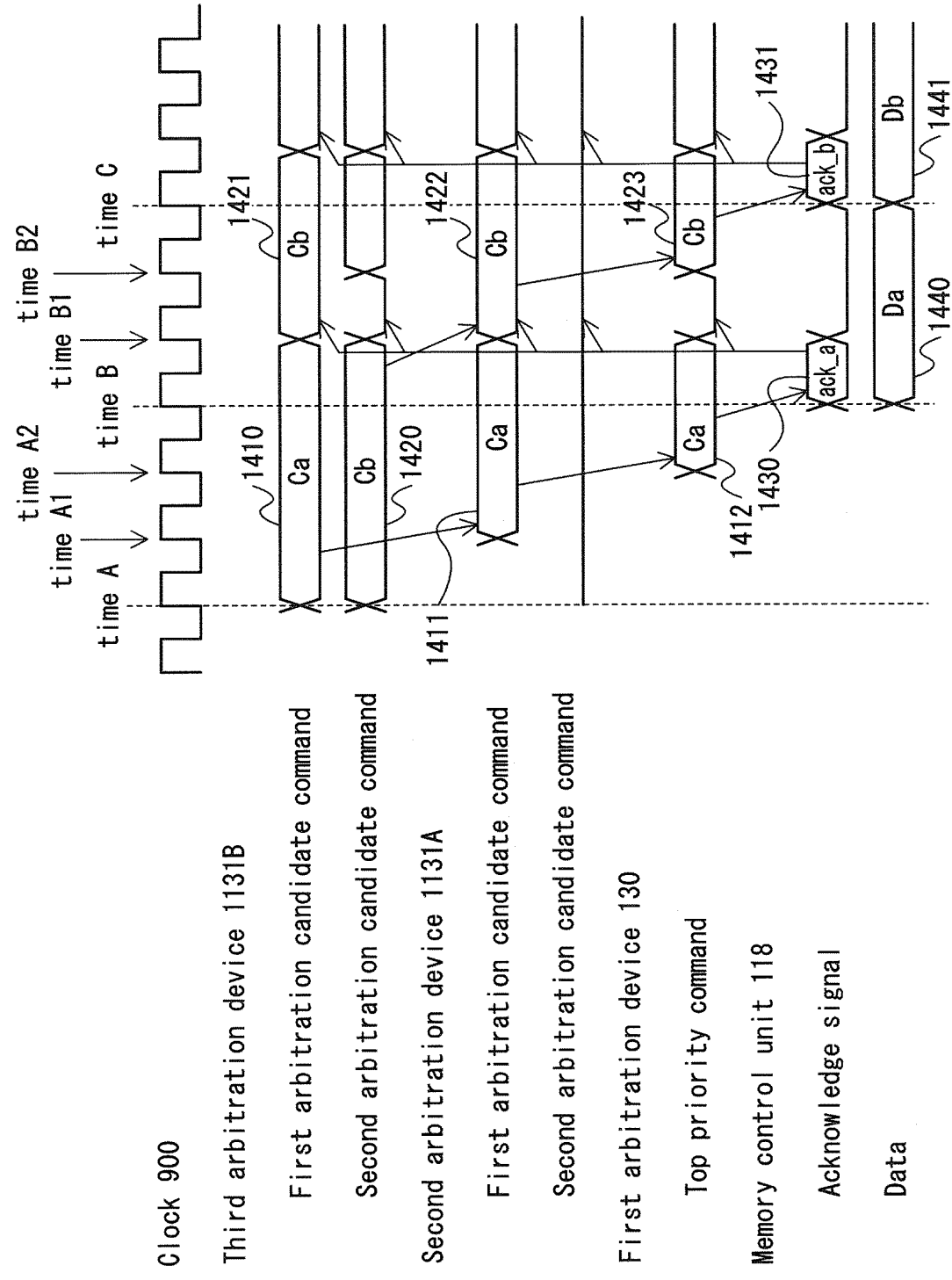
FIG. 14 is a timing chart of internal signals in the first modified system LSI 100.

FIG. 14 is a timing chart of internal signals in the first modified system LSI for a specific example illustrating first modified arbitration.

In this specific example, at time A, the third arbitration device 1131B outputs a command Ca 1410 (read request command to read the external memory 101) as the first arbitration candidate memory use request command and a command Cb 1420 (read request command to read the external memory 101) as the second arbitration candidate memory use request command During the period from time A to time C, no master issues any new memory use request commands.

At time A, the third arbitration device 1131B outputs the command Ca 1410 as the first arbitration candidate memory use request command and the command Cb 1420 as the second arbitration candidate memory use request command to the second arbitration device 1131A. At time A1, i.e. when the next clock signal rises, the second arbitration device 1131A outputs a command Ca 1411 as the first arbitration candidate memory use request command and a signal with all zeros as the second arbitration candidate memory use request command to the first arbitration device 130.

At time A2, the first arbitration device 130 outputs a command Ca 1412 to the memory control unit 118 as the top priority command.

At time B, the memory control unit 118 outputs an acknowledge signal ack_a 1430, which includes master identifying information included in the command Ca 1412, to all of the arbitration devices. Furthermore, over three cycles the memory control unit 118 reads data Da 1440 stored in a 96-byte memory region in the external memory 101 at the starting address included in the command Ca 1412 and outputs, over three cycles, the data Da 1440 to the main bus 120, which has a 32-byte bus width.

Between time B and time B1, all of the arbitration devices 130 receive the acknowledge signal ack_a 1430 output by the memory control unit 118.

Having received the acknowledge signal ack_a 1430 from the memory control unit 118, at time B1 the second arbitration device 1131A switches the top priority command from the command Ca 1411 to a command Cb 1422 and outputs the top priority command.

At time B2, the first arbitration device 130 outputs a command Cb 1423 to the memory control unit 118 as the top priority command.

At time C, the memory control unit 118 outputs an acknowledge signal ack_b 1431, which includes master identifying information included in the command Cb 1423, to all of the arbitration devices. Furthermore, over three cycles the memory control unit 118 reads data Db 1441 stored in a 96-byte memory region in the external memory 101 at the starting address included in the command Cb 1424 and outputs, over three cycles, the data Db 1441 to the main bus 120, which has a 32-byte bus width.

The memory control unit 118 thus consecutively reads, from the external memory 101, data Da 1440 and data Db 1441 and outputs the data to the main bus 120. Therefore, the bubble phenomenon does not occur in the external memory 101 between output of the data Da 1440 and output of the data Db 1441.

<Summary>

With the first modified system LSI, if for example the period from output of one set of arbitration results until output of the next set of arbitration results by the third arbitration device 1131B (i.e. the latency of the third arbitration device 1131B) is four cycles as shown in the specific example, then even if the period during which a master uses the external memory 101 is three cycles, the bubble phenomenon does not occur.

All of the masters in the above configuration have been described as adopting the same fixed data length of 96 bytes. In an actual configuration, however, it is possible for each master to choose a different fixed data length. In such a case, one setting register exists for each master.

Furthermore, since the second arbitration device 1131A in the first modified system LSI always outputs a signal with all zeros as the second arbitration memory use request command, less power is consumed than in a configuration in which the second arbitration device outputs a signal other than all zeros as the second arbitration memory use request command.

Embodiment 3

The following describes, as Embodiment 3 of an arbitration device according to the present invention, a second modified system LSI that is a partial modification of the first modified system LSI according to Embodiment 2.

If the number of clock cycles for which a master uses the memory is equal to or greater than the number of clock cycles from when each arbitration device in the second modified system LSI outputs the first arbitration memory use request command until the arbitration device receives an acknowledge signal that is a response signal corresponding to the first arbitration memory use request command and outputs the next first arbitration memory use request command, the arbitration device does not output a second arbitration memory use request command.

In the first modified system LSI, access to a memory region by each master is a fixed length of 96 bytes, but in the second modified system LSI, the size of access to a memory region by each master is a variable length.

The following describes the configuration of the second modified system LSI according to Embodiment 3 with reference to the drawings, focusing on the differences with the first modified system LSI according to Embodiment 2.

<Configuration>

The differences between the second modified system LSI according to Embodiment 3 and the first modified system LSI according to Embodiment 2 are (1) that the arbitration device 1131 is changed to an arbitration device 1631, and (2) that data written to and read from a memory region by each master is changed to variable access with a length that is a multiple of 32 bytes.

Figure 15:
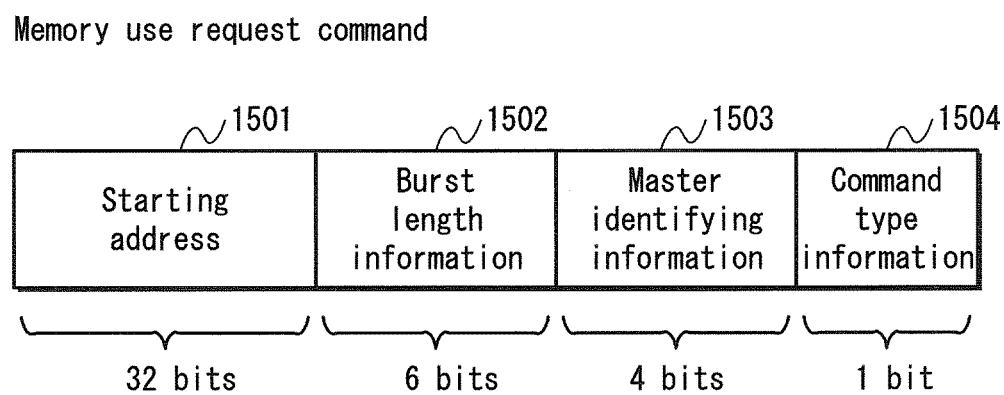
FIG. 15 is a data structure diagram of a memory use request command.

FIG. 15 is a data structure diagram of a memory use request command output by the masters.

As shown in FIG. 15, the memory use request command includes a starting address 1501, burst length information 1502, master identifying information 1503, and command type information 1504.

The starting address 1501 is the same as the starting address 1201 in Embodiment 1, the master identifying information 1503 is the same as the master identifying information 202 in Embodiment 1, and the command type information 1504 is the same as the command type information 203 in Embodiment 1. Accordingly, a description of these pieces of information is omitted.

The burst length information 1502 is a six-bit piece of data indicating the size, in multiples of 32 bytes, of a memory region that is accessed.

For example, if the size of a memory region that is accessed is 96 bytes, the burst length information 1502 is "000011".

Figure 16:
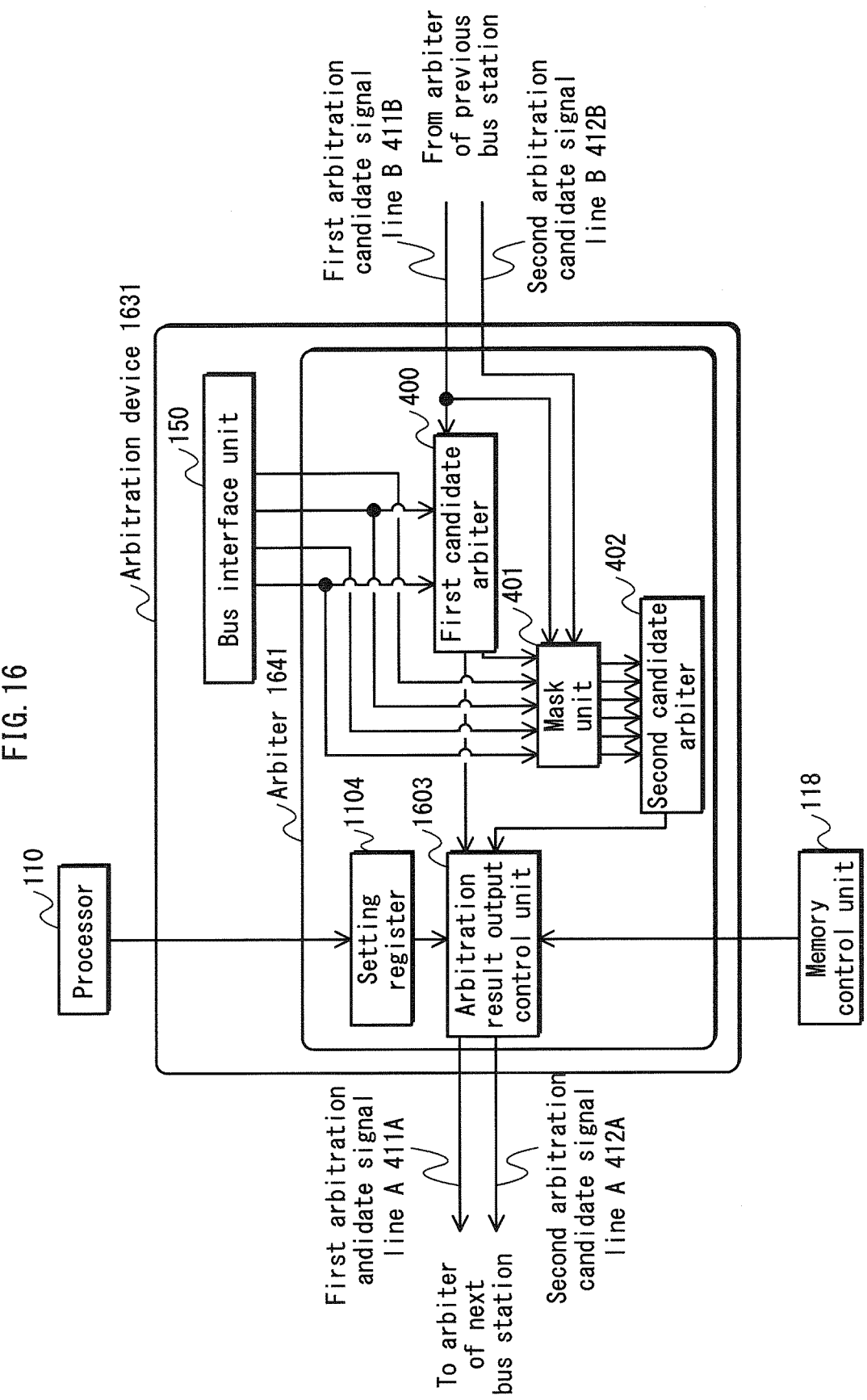
FIG. 16 is a configuration diagram of an arbitration device 1631.

FIG. 16 is a configuration diagram of the arbitration device 1631.

The arbitration device 1631 is a partial modification of the arbitration device 1131 in Embodiment 2, in which the arbiter 1141 in the arbitration device 1131 is replaced with an arbiter 1641.

The arbiter 1641 is a partial modification of the arbiter 1141 in Embodiment 2, in which the arbitration result output control unit 1103 in the arbiter 1141 is replaced with an arbitration result output control unit 1603.

The arbitration result output control unit 1603 is connected to the first candidate arbiter 400, second candidate arbiter 402, memory control unit 118, first arbitration candidate signal line A 411A, second arbitration candidate signal line A 412A, and setting register 1104, operates in synchronization with the clock signal, and includes the following three functions.

Function 1: after receiving the first command from the first candidate arbiter 400 and the second command from the second candidate arbiter 402, when during the clock cycle in which these commands are received, the arbitration result output control unit 1603 does not receive from the memory control unit 118 an acknowledge signal that includes master identifying information included in the first command, and furthermore when the value of the burst length information included in the first command is greater than the number of clock cycles set in the setting register 1104, then when the next clock signal rises, the arbitration result output control unit 1603 outputs the first command to the first arbitration candidate signal line A 411A as the first arbitration candidate memory use request command and outputs the second command to the second arbitration candidate signal line A 412A as the second arbitration candidate memory use request command.

Function 2: after receiving the first command from the first candidate arbiter 400 and the second command from the second candidate arbiter 402, when during the clock cycle in which these commands are received, the arbitration result output control unit 1603 does not receive from the memory control unit 118 an acknowledge signal that includes master identifying information included in the first command, and furthermore when the value of the burst length information included in the first command is not greater than the number of clock cycles set in the setting register 1104, then the arbitration result output control unit 1603 outputs the first command to the first arbitration candidate signal line A 411A as the first arbitration candidate memory use request command and outputs a signal with all zeros to the second arbitration candidate signal line A 412A as the second arbitration candidate memory use request command.

Function 3: after receiving the first command from the first candidate arbiter 400 and the second command from the second candidate arbiter 402, when during the clock cycle in which these commands are received, the arbitration result output control unit 1603 receives from the memory control unit 118 an acknowledge signal that includes master identifying information included in the first command, then when the next clock signal rises, the arbitration result output control unit 1603 outputs the second command to the first arbitration candidate signal line A 411A as the first arbitration candidate memory use request command and outputs a signal with all zeros to the second arbitration candidate signal line A 412A as the second arbitration candidate memory use request command.

The following is a description, with reference to the drawings, of the operations of the second modified system LSI with the above configuration.

<Operations>

Among the operations of the second modified system LSI, the following is a description of representative operations, namely second modified arbitration by hierarchical level by the arbitration device 1631.

<Second Modified Arbitration by Hierarchical Level>

Second modified arbitration by hierarchical level is a partial modification of the first arbitration by hierarchical level performed by the arbitration device 1131.

Figure 17:
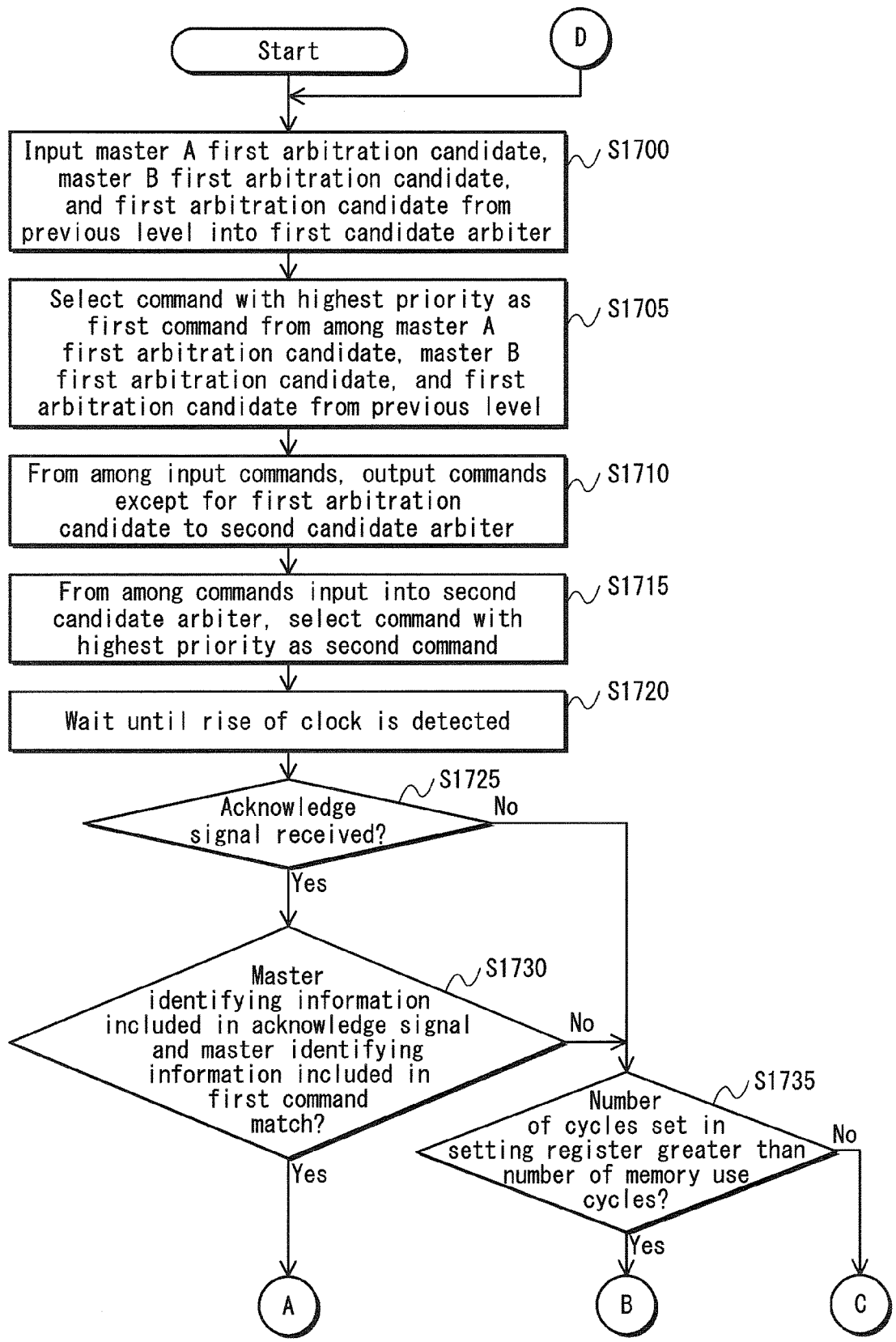
FIG. 17 is part 1 of a flowchart showing second modified arbitration by hierarchical level.
Figure 18:
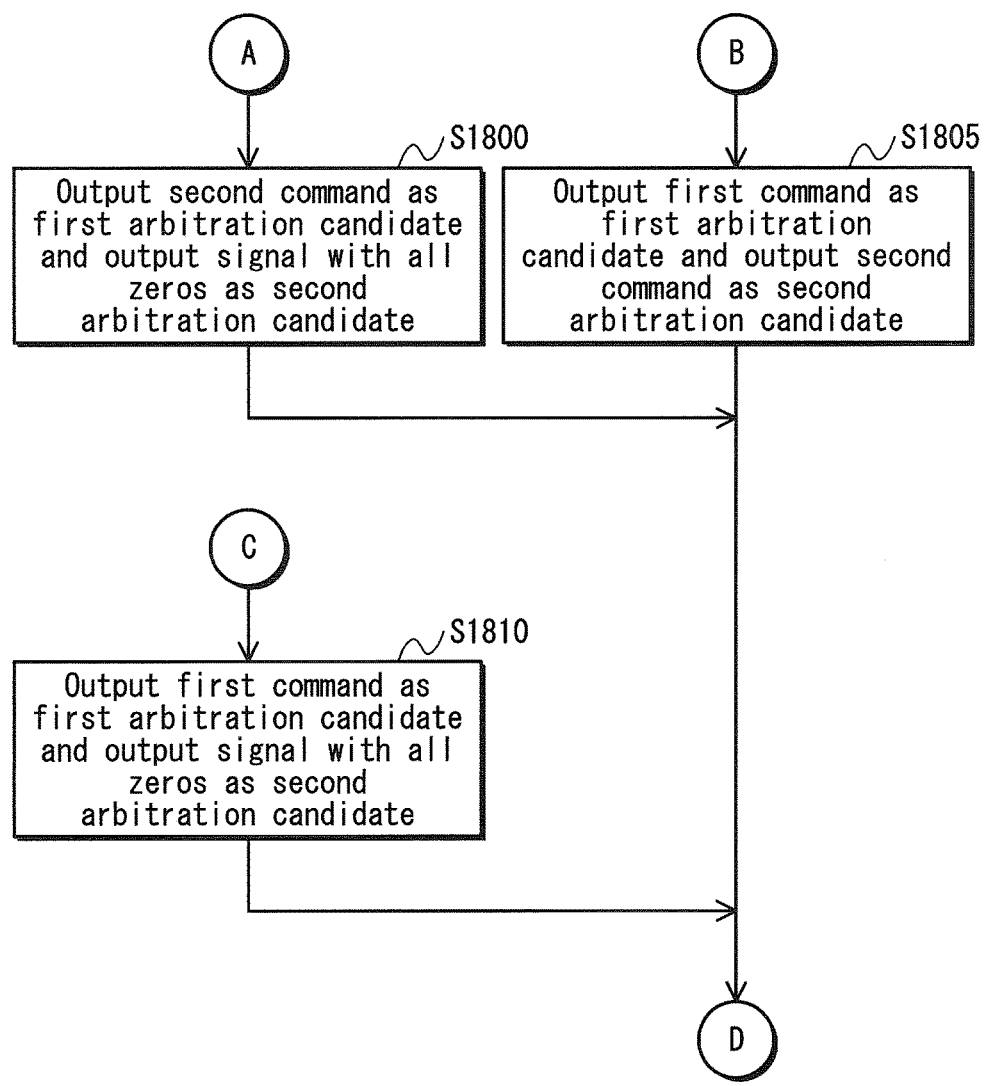
FIG. 18 is part 2 of the flowchart showing second modified arbitration by hierarchical level.

FIGS. 17 and 18 are a flowchart showing the second modified arbitration by hierarchical level performed by the arbitration device 1631.

During the second modified arbitration by hierarchical level, processing from step S1700 through step S1730 is the same as processing from step S1200 through step S1230 during the first modified arbitration by hierarchical level, replacing the arbitration result output control unit 1103 with the arbitration result output control unit 1603. Accordingly, a description of the processing in these steps is omitted.

In step S1730, if the master identifying information included in the received acknowledge signal matches the master identifying information included in the first command (step S1730: Yes), then when the next clock signal rises, the arbitration result output control unit 1603 outputs, to the arbitration device 1631 at the next level, the received second command as the first arbitration candidate memory use request command and a signal with all zeros, indicating non-existence of a memory use request command, as the second arbitration candidate memory use request command (step S1800).

In step S1725, if the arbitration result output control unit 1103 does not receive an acknowledge signal from the memory control unit 118 while waiting until the rise of the next clock signal (step S1725: No), or in step S1730, if the master identifying information included in the acknowledge signal does not match the master identifying information included in the received first command (step S1730: No), then the arbitration result output control unit 1603 compares the value of the burst length information included in the first command with the number of clock cycles set in the setting register 1104 (step S1735).

In step S1735, if the value of the burst length information included in the first command is larger than the number of clock cycles set in the setting register 1104 (step S1735: Yes), then when the next clock signal rises, the arbitration result output control unit 1603 outputs, to the arbitration device 1631 at the next level, the received first command as the first arbitration candidate memory use request command and the received second command as the second arbitration candidate memory use request command (step S1805).

In step S1735, if the value of the burst length information included in the first command is not larger than the number of clock cycles set in the setting register 1104 (step S1735: No), then when the next clock signal rises, the arbitration result output control unit 1603 outputs, to the arbitration device 1631 at the next level, the received first command as the first arbitration candidate memory use request command and a signal with all zeros, indicating non-existence of a memory use request command, as the second arbitration candidate memory use request command (step S1810).

<Summary>

If the number of clock cycles for which a master uses the memory is equal to or greater than the number of clock cycles from when the arbitration device 1631 in the second modified system LSI outputs the first arbitration memory use request command until the arbitration device 1631 receives an acknowledge signal that is a response signal corresponding to the first arbitration memory use request command and outputs the next first arbitration memory use request command, the arbitration device 1631 outputs a signal with all zeros as the second arbitration memory use request command. Therefore, less power is consumed than in a configuration in which each arbitration device outputs a signal other than all zeros as the second arbitration memory use request command.

<Supplementary Explanation>

While this concludes the description of system LSIs provided with the hierarchical arbitration devices according to Embodiments 1-3 as embodiments of an arbitration device according to the present invention, the following modifications are also possible, and the present invention is certainly not limited to the arbitration devices exactly as described in the above embodiments.

(1) In Embodiment 1, the processor, video output engine, encryption engine, stream engine, decoder, encoder, and image enhancement engine are described as examples of masters, but masters are not limited in this way. Any component with a function to use a resource as a slave can be a master, such as an image playback device, digital tuner, etc.

(2) In Embodiment 1, an example in which the external memory is a slave is described, but the slave is not limited to the external memory. Any component with a function to be used by a master can be a slave, such as an internal memory, encryption engine, decoder, image playback device, digital tuner, Digital to Analog (DA) converter, Universal Serial Bus (USB), interface, multiplication circuit, etc.

(3) In Embodiment 1, the main bus 120 is a 32-byte bidirectional bus, but the main bus 120 is not limited to being bidirectional. Any bus with a function to transmit data may be the main bus, such as the following: a bus with two sets of signal lines, a set of signal lines to transmit data from a slave to a master, and a set of signal lines to transmit data from a master to a slave; a bus with a ring structure; a bus with a cross-bar structure; etc.

Furthermore, the bus width of the main bus 120 is not limited to 32 bytes, but may be four bytes, 256 bytes, etc.

(4) In Embodiment 1, an example is described in which four arbitration devices are connected in series in the hierarchical arbitration device 105, but as long as the number of arbitration devices connected in series is two or greater, the number is not limited to four, but may for example be three or six.

(5) In Embodiment 1, an example is described in which the arbitration device 131 can output two memory use request commands, the memory use request command having the highest priority and the memory use request command having the second highest priority. As long as the arbitration device can output the memory use request command having the highest priority and the memory use request command having the second highest priority, a structure in which the arbitration device also outputs a memory use request command with the third highest priority is possible.

(6) In Embodiment 1, an example is described in which the algorithm for selecting the memory use request command having the highest priority in the first candidate arbiter 400 and second candidate arbiter 402 is based on information according to a predetermined priority ranking. However, the algorithm for selecting the memory use request command having the highest priority is not limited to being based on information according to a predetermined priority ranking, as long as the algorithm uniquely selects a memory use request command having the highest priority, as does an algorithm according to the Earliest Deadline First (EDF) method, for example.

(7) In Embodiment 1, an example is described in which the acknowledge signal output by the memory control unit 118 is received by all of the arbitration devices during the clock cycle in which the acknowledge signal is output. However, it is not necessary for all of the arbitration devices to receive the acknowledge signal during the same clock cycle, as long as all of the arbitration devices do receive the acknowledge signal.

For example, it is possible for the number of clock cycles from the output of the acknowledge signal until receipt of the acknowledge signal to increase as the physical distance from the arbitration device to the memory control unit 118 increases.

(8) In Embodiment 1, an example is described in which the constituent elements of the system LSI 100 are integrated on the system LSI 100, which is one LSI, yet integration on one LSI is not necessary. Any system that can implement the same functions as the system LSI 100 is possible, such as a structure in which constituent elements are integrated on separate LSIs.

(9) The system LSI 100, first modified system LSI, and second modified system LSI respectively described in Embodiments 1-3 are useful in a variety of systems, such as a Blu-ray recorder system, cellular phone, terminal for a vehicle, etc.

Figure 19:
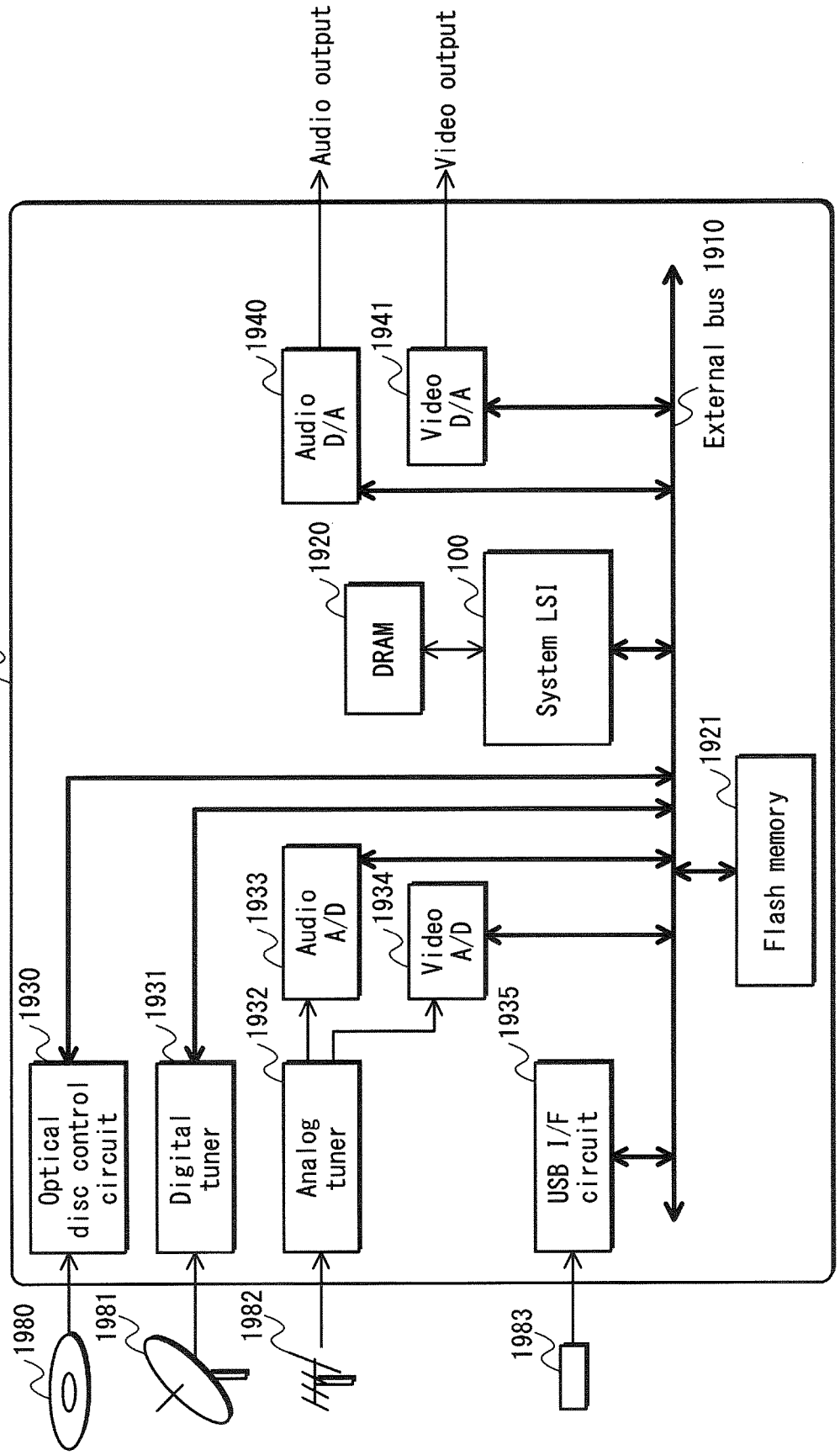
FIG. 19 is a configuration diagram of a Blu-ray recorder system 1900.

FIG. 19 is a configuration diagram of a Blu-ray recorder system 1900 that uses a system LSI 100.

(10) In the system LSI 100 described in Embodiments 1-3, an example is described in which the first arbitration device 130 and the second arbitration device 131A through fourth arbitration device 131C operate in synchronization with a shared clock signal, but the arbitration devices do not need to be limited to operating in synchronization with a shared clock signal.

For example, each arbitration device may operate in synchronization with a clock signal having an independent frequency. Furthermore, each constituent element in an arbitration device may operate in synchronization with a clock signal having an independent frequency.

(11) In the system LSI 100 described in Embodiments 1-3, an example is described in which the second arbitration device 131A through fourth arbitration device 131C output the first arbitration candidate memory use request command via the first arbitration candidate signal line and the second arbitration candidate memory use request command via the second arbitration candidate signal line, but these arbitration devices do not need to be limited to outputting the first arbitration candidate memory use request command and the second arbitration candidate memory use request command via two separate signal lines.

For example, each arbitration device may use one signal line to serially output the first arbitration candidate memory use request command and the second arbitration candidate memory use request command over two clock cycles.

INDUSTRIAL APPLICABILITY

The present invention may be widely used in systems in which a plurality of masters share a resource as a slave.

REFERENCE SIGNS LIST

100 system LSI
101 external memory
105 hierarchical arbitration device
110 processor
111 video output engine
112 encryption engine
113 stream engine
114 decoder A
115 decoder B
116 encoder
117 image enhancement engine
118 memory control unit
120 main bus
130 first arbitration device
131A second arbitration device
131B third arbitration device
131C fourth arbitration device
140 arbiter
141A-141C arbiters
150A-150D bus interface units
161A-161C first arbitration candidate signal lines
162B-162B second arbitration candidate signal lines

The invention claimed is:
1. An arbitration system comprising:
one or more arbitration devices including a first arbitration device, each of the arbitration devices including:
a first receiving unit operable to receive one or more resource use request commands from a plurality of devices;
an arbitration unit operable, when the first receiving unit receives a set of two or more resource use request commands during each of a plurality of predeter- mined cycles, to evaluate a priority of each resource use request command in the set and to select from the set a first resource use request command having a highest priority and a second resource use request command having a second highest priority;

an output unit operable to output the first resource use request command and the second resource use request command selected by the arbitration unit to an external destination during each of the predetermined cycles; and a second receiving unit operable to receive a resource use response signal that includes information identifying a resource use request command, wherein upon receipt of the resource use response signal by the second receiving unit, the arbitration unit is operable to remove the resource use request command identified by the resource use response signal from the set from which the first resource use request command and the second resource use request command are selected, wherein the arbitration system further comprises:

a third receiving unit operable to receive the first resource use request command and the second resource use request command output by the first arbitration device and a resource use request command from one or more devices;

a final arbitration unit operable, for a set of resource use request commands received by the third receiving unit during each of the predetermined cycles, to evaluate a priority of each resource use request command in the set and to select from the set a top priority resource use request command having a highest priority;

a final output unit operable to output, during each of the predetermined cycles, the top priority resource use request command selected by the final arbitration unit;

a resource use request command receiving unit operable to receive the top priority resource use request command output by the final output unit;

a fourth receiving unit operable to receive a resource use response signal; and a resource use response signal output unit operable, when the resource use request command receiving unit receives the top priority resource use request command, to output a resource use response signal including information identifying the top priority resource use request command to the second receiving unit and the fourth receiving unit, and wherein upon receipt of the resource use response signal by the fourth receiving unit, the final arbitration unit is operable to remove the resource use request command identified by the resource use response signal from the set from which the top priority resource use request command is selected.

2. The arbitration system of claim 1,
wherein each resource use request command received by each first receiving unit includes information identifying a period of resource use, and
wherein the output unit in each of the one or more arbitration devices outputs the second resource use request command during a same cycle as the first resource use request command only when the period of resource use of the first resource use request command is equal to or less than a predetermined period.

3. The arbitration system of claim 1,
wherein each resource use request command received by each first receiving unit includes information identifying a period of resource use, and
wherein the output unit in each of the one or more arbitration devices outputs the second resource use request command during a same cycle as the first resource use request command only when a predetermined relationship is satisfied between (i) the period of resource use of the first resource use request command and (ii) a time lag until the first resource use request command arrives at the resource use request command receiving unit.

4. The arbitration system of claim 1,
wherein each resource use request command is for memory, and
wherein the resource use response signal output unit outputs a signal to the memory to initiate output of data from an identified region of the memory when the top priority resource use request command, received by the resource use request command receiving unit, indicates reading from the identified region.

5. The arbitration system of claim 1,
wherein each resource use request command is for memory, and
wherein the resource use response signal output unit outputs a signal to the memory to initiate writing of data to an identified region of the memory when the top priority resource use request command, received by the resource use request command receiving unit, indicates writing to the identified region.

6. An image processing apparatus comprising the arbitration system according to claim 1,
wherein the device includes at least an image processing engine, and
wherein a resource used via a resource use request command includes at least a memory used by the image processing engine.

* * * * *